(12) United States Patent
Braun et al.

(10) Patent No.: US 7,723,599 B2
(45) Date of Patent: *May 25, 2010

(54) LEARNING DEVICE

(75) Inventors: Michael Eric Braun, San Francisco, CA (US); John Keefe, Charlottesville, VA (US); Peter W. Keefe, Charlottesville, VA (US); Jennifer L. Keefe, legal representative, Charlottesville, VA (US)

(73) Assignee: InkTree, Inc., Seattle, WA (US)

( * ) Notice: Subject to any disclaimer, the term of this patent is extended or adjusted under 35 U.S.C. 154(b) by 866 days.

This patent is subject to a terminal disclaimer.

(21) Appl. No.: 11/495,970

(22) Filed: Jul. 28, 2006

(65) Prior Publication Data

US 2008/0022841 A1    Jan. 31, 2008

(51) Int. Cl.
*G10D 3/00*    (2006.01)

(52) U.S. Cl. .................................................. 84/483.1

(58) Field of Classification Search ............... 84/483.1, 84/483.2; 211/60.1, 70.1; 206/425, 748, 206/461, 308.1, 308.2, 308.3
See application file for complete search history.

(56) References Cited

U.S. PATENT DOCUMENTS

| | | | |
|---|---|---|---|
| 260,372 A | 7/1882 | Damborg |
| 650,783 A | 5/1900 | Martin, Jr. |
| 792,210 A | 6/1905 | Hardy |
| 915,581 A | 3/1909 | Foreman |
| 1,159,459 A | 11/1915 | Wood |
| 1,354,176 A | 9/1920 | Dobson |
| 1,363,081 A | 12/1920 | Brown |
| 1,378,063 A | 5/1921 | Swick |
| 1,697,350 A | 1/1929 | Eubank |
| 1,705,116 A | 3/1929 | Howland |
| 1,841,310 A | 1/1932 | Apffel |
| 1,853,829 A | 4/1932 | Maury |
| 1,964,278 A | 6/1934 | Walter |
| 2,504,277 A | 4/1950 | Otterson |
| 2,717,437 A | 9/1955 | De Mestral |
| 3,248,806 A | 5/1966 | Schrader |

(Continued)

FOREIGN PATENT DOCUMENTS

GB    2086116    5/1982

(Continued)

OTHER PUBLICATIONS

PCT International Search Report dated February 19, 2008.

(Continued)

*Primary Examiner*—Kimberly R Lockett
(74) *Attorney, Agent, or Firm*—McCarter & English, LLP

(57) ABSTRACT

A device for reading and learning indicia, particularly music notation and other music-related indicia, is disclosed. The device is constructed with at least one sheet and has a main image portion and a hanging portion. The main image portion is foldable about first folds and second folds and the hanging portion is foldable about an edge fold and second folds to form a variety of display, storage and travel configurations, including a poster configuration, self-standing configuration, storage pocket configuration and pocket folder configuration. Fastening devices are employed to releasably maintain contact between the surfaces of the learning device. Indicia may be positioned anywhere on the learning device to facilitate reading and learning.

23 Claims, 16 Drawing Sheets

U.S. PATENT DOCUMENTS

| | | | |
|---|---|---|---|
| 3,661,319 A | | 5/1972 | Koehler |
| D262,040 S | | 11/1981 | Wihlke |
| 4,464,971 A | | 8/1984 | Dean |
| 4,537,111 A | | 8/1985 | Heath |
| 4,538,883 A | | 9/1985 | Sprague et al. |
| 4,540,612 A | | 9/1985 | Rhyner |
| 4,673,197 A | | 6/1987 | Shtipelman et al. |
| 4,906,024 A | | 3/1990 | Lein |
| 4,919,618 A | | 4/1990 | Andersen |
| D312,095 S | | 11/1990 | Mandel |
| 5,063,637 A | | 11/1991 | Howard, Jr. et al. |
| 5,207,457 A | | 5/1993 | Haynes |
| 5,234,231 A | | 8/1993 | Hollander et al. |
| 5,273,432 A | | 12/1993 | White |
| 5,291,990 A | * | 3/1994 | Sejzer .................. 206/748 |
| 5,405,019 A | | 4/1995 | Cross |
| 5,405,022 A | | 4/1995 | Rissley |
| 5,547,077 A | * | 8/1996 | Wang .................. 206/307.1 |
| 5,794,980 A | | 8/1998 | Bigler |
| 5,811,705 A | | 9/1998 | Glenn |
| 5,868,429 A | | 2/1999 | Raymond et al. |
| 6,045,158 A | | 4/2000 | Bergstresser |
| 6,073,769 A | * | 6/2000 | Fulda .................. 206/455 |
| 6,209,919 B1 | | 4/2001 | Nilsson et al. |
| 6,273,417 B1 | | 8/2001 | Berlingen et al. |
| 6,334,631 B1 | | 1/2002 | Hollander |
| 6,749,228 B2 | | 6/2004 | Takemura |
| 6,822,151 B2 | | 11/2004 | West |
| 6,870,085 B2 | | 3/2005 | MacCutcheon |
| 7,004,507 B2 | | 2/2006 | Shulman |
| 2001/0019206 A1 | | 9/2001 | Deans |
| 2002/0125712 A1 | | 9/2002 | Feldeman |
| 2003/0051381 A1 | | 3/2003 | Hernandez et al. |
| 2003/0104346 A1 | | 6/2003 | Stein |
| 2005/0155259 A1 | | 7/2005 | Virvo |

FOREIGN PATENT DOCUMENTS

WO      WO 94/15324      7/1994

OTHER PUBLICATIONS

CompleteChords.com, "About CompleteChords.com", http://www.completechords.com/Pages_Sidebranch_About_Us/About_Us.htm, Mar. 7, 2006.

CompleteChords.com, "See All Chords and Scales in Every Key on a Single Chart", http://www.completechords.com/index.html, Mar. 7, 2006.

CompleteChords.com, "Roedy Black's Product Gallery," http://www.completechords.com/Pages_Pathway_Product_Gallery/Product_Gallery.htm, Mar. 7, 2006.

CompleteChords.com, "Complete Keyboard Chord Poster!", http://www.completechords.com Pages_Pathway_Posters/Poster_Keyboard_Chord_1.htm, Mar. 7, 2006.

CompleteChords.com, "Musical Instruments Poster," http://www.completechords.com Pages_Pathway_ Posters/Poster_Musical Instruments-1.htm, Mar. 7, 2006.

CompleteChords.com, "Roedy Black's Chord Progression Chart," http://www.completechords.com Pages_Pathway_Posters/Poster_Chord_Progression.htm, Mar. 7, 2006.

CompleteChords.com, "Simple and Convenient . . . Roedy Black's Guitar & Keyboard Scales Poster", http://www.completechords.com Pages_Pathway_Posters/Poster_Scales_1.htm, Mar. 7, 2006.

CompleteChords.com, ". . . Complete Guitar Chord Poster!," http://www.completechords.com Pages_Pathway_Posters/Poster_Guitar_Chord_ 1.htm, Mar. 7, 2006.

Exhibit 1: Street Smart Paris Map, © 2004, Van Dam Inc.
Exhibit 2: Streetwise Los Angeles, © 1993, Streetwise Maps Inc.
Exhibit 3: Boston & Vicinity Easy Finder, © 2003, Rand McNally.
Exhibit 4: Silver Linings Best Map of Manhattan, © 2005, MapQuest.
Exhibit 5: Rome Red Map, Red Maps, 5th Edition, 2007.
Exhibit 6: Virginia *Frog Map*, © 1999, Frog Map Co.

* cited by examiner

LEARNING DEVICE

FIELD OF INVENTION

The present invention relates generally to a device for reading and learning. More particularly, the invention relates to a device that facilitates reading, learning and playing music notation as well as reading music-related indicia.

BACKGROUND OF THE INVENTION

Music notation is widely used for learning and playing a piece of music. The traditional way of notating music is through the use of a system of notes, letters, marks and other symbols arranged on a group of five parallel lines, called a staff or stave. Pitch is shown by the placement of notes on the staff and duration is shown with different note shapes and additional symbols, such as ties. More recently, and with increasing popularity, music is also being notated using tablature, a form first used in the Renaissance for lute music. Tablature notation uses vertical lines to represent the strings of an instrument, horizontal lines to represent the frets of an instrument and dots selectively placed on the horizontal lines to indicate finger placement. In sum, tablature notation tells a musician where to place his or her fingers on a particular instrument rather than which pitches to play. Tablature is typically used to notate music for fretted string instruments, e.g., guitar, bass, lute, mandolin and banjo and, today, is most commonly used in notating pop music.

Music notation has traditionally been written or printed on sheets of paper approximately 8½"×11" in size, providing for convenient storage and transport of the music as well as use on a music stand during practice and/or performance. See U.S. Pat. No. 1,354,176 to Dobson and U.S. Pat. No. 650,783 to Martin. As a result, however, conventional music notation is small in size and does not facilitate group collaboration, particularly among musicians working on the same piece of music. Sharing a single piece of music detracts from a musician's overall learning experience when studying with others. This is particularly disadvantageous in those settings where two or more musicians are trying to learn a new song or a new part of a song together from the same piece of music. For example, two guitar players may want to strum through the chords of a song in unison or have one guitarist play chords while the other guitarist plays a solo. The inconvenience and frustration of crowding around a single 8½"×11" sheet of music hinders a musician's ability to learn and causes unneeded expense by requiring musicians to purchase additional copies of the same piece of notation.

Moreover, a single piece of music often requires the use of multiple pages to notate an entire song for a single instrument. In turn, a practicing or performing musician is required to remove at least one hand from his or her instrument to turn to the next page of music. Keeping both hands on the instrument is critical for most instruments and removal thereof marks a significant interruption in the learning process. This is particularly problematic for beginning musicians trying to develop rudimentary finger techniques, proper playing posture, sight-reading skills and an understanding of rhythm. It is well-known in the art that many novice musicians never advance past the first page of music notation in light of the difficulty in turning a page while keeping both hands on the instrument. As a result, many musicians are never able to learn a single song in its entirety.

Furthermore, it is becoming increasingly more common for ensembles, e.g., rock bands, jazz bands and many other musical groups, to learn and play a broad repertoire of popular music comprising songs written and/or performed by a variety of artists. Music notation for these songs is commonly published and sold as part of a bundle or collection of transcriptions within a magazine or as a book of songs from a particular time period by a single artist or music group. Therefore, musicians are often required to purchase an entire magazine or book to obtain the music notation for a single song. In addition, a majority of these magazines and books are not self-standing and require the use of a music stand or some other support device. For many musicians, particularly those traveling from performance to performance, carrying a music stand is inconvenient or often not feasible. This issue of portability is compounded when a group of musicians are collaborating and each needs his or her own stand to display their music. Further still, such magazines and books are typically manufactured with stiff bindings that tend to make reading, learning and playing a piece of music notation a frustrating and unproductive experience, detracting from the musician's ability to learn and play an entire song.

SUMMARY OF THE INVENTION

Accordingly, there is a need for a device for displaying indicia in a way that facilitates group collaboration and eliminates interruptions in reading and learning indicia caused by discontinuities, such as page turns, in the displayed indicia. There is further need for a device for displaying indicia that is self-standing and eliminates the need for a music stand or other support device. Finally, there is a need for a device for displaying music notation of one entire song on a single surface of a sheet of material.

In accordance with one embodiment, the learning device has at least one sheet, the at least one sheet having a main image portion and a hanging portion. The main image portion has a front surface and a back surface and at least three rows defined by two or more first folds and at least one column normal to the first folds intersecting the at least one column to form a grid of three of more panels. The hanging portion also has a front surface and a back surface and at least one column. The hanging portion is located along an edge of the main image portion and foldable toward the main image portion about an edge fold. The main image portion folds about the first folds and the hanging portion folds about the edge fold to cause a portion of the front or back surface of the main image portion to be in contact with at least a portion of the front or back surface of the hanging portion to form a self-standing structure that outwardly displays a surface of the main image portion. The contact is releasably maintained by at least one fastening device.

In another embodiment, the learning device has at least one sheet, the at least one sheet having a main image portion and a hanging portion. The main image portion has a front surface and a back surface and two or more first folds defining at least three rows and one or more second folds normal to the first folds defining at least two columns. The first folds intersect the second folds to form a grid of six or more panels. The front or back surface of the main image portion display indicia relating to music. In addition, the hanging portion has a front surface and a back surface and one or more second folds defining at least two columns. The hanging portion is located along an edge of the main image portion and foldable toward the main image portion about an edge fold. The main image portion folds about the first folds and the hanging portion folds about the edge fold to cause a portion of the front or back surface of the main image portion to be in contact with at least a portion of the front or back surface of the hanging portion to form a triangular self-standing structure that outwardly displays a surface of the main image portion. The main image portion also folds about the first folds to form one row and the hanging portion folds about the edge fold to cause the front or back surface of the hanging portion to be in contact with the one row to form a storage pocket along the one row. The one row then folds about the second folds to form a pocket folder. The contact is releasably maintained by a fastening device.

In another embodiment, the learning device has at least one sheet of flexible support material, a main image portion and a hanging portion. The main image portion has a front surface and a back surface and three or more separate panels of at least one sheet. The panels are fixed to the flexible support material and spaced apart to provide gaps between each panel. The gaps define folds in the flexible support material. The main image portion has at least three rows defined by two or more first folds and at least one column normal to the rows, the rows intersecting the at least one column to form a grid of three or more panels. The hanging portion has a front surface and back surface and at least one panel of at least one sheet. The hanging portion is fixed to the flexible support material and spaced apart from the main image portion along an edge of the main image portion to provide a gap between the hanging portion and the main image portion. The gap defines an edge fold about which the hanging portion folds toward the main image portion. The main image portion folds about the first folds and the hanging portion folds about the edge fold to cause a portion of the front or back surface of the main image portion to be in contact with at least a portion of the front or back surface of the hanging portion to form a triangular self-standing structure that outwardly displays a surface of the main image portion. The main image portion further folds about the first folds to form one row and the hanging portion folds about the edge fold to cause the front or back surface of the hanging portion to be in contact with the one row to form a storage pocket along the one row. The one row then folds about at least one second fold to form a pocket folder. The contact is releasably maintained by at least one fastening device.

DETAILED DESCRIPTION

In accordance with the foregoing objectives and others, a learning device is provided that is convertible between a poster for reading and learning in a group or solitary setting free of interruptions or discontinuities in the display of indicia, a self-standing structure for displaying the indicia without the need of a separate support device and a pocket folder for conveniently storing and transporting the learning device.

Figure 1:
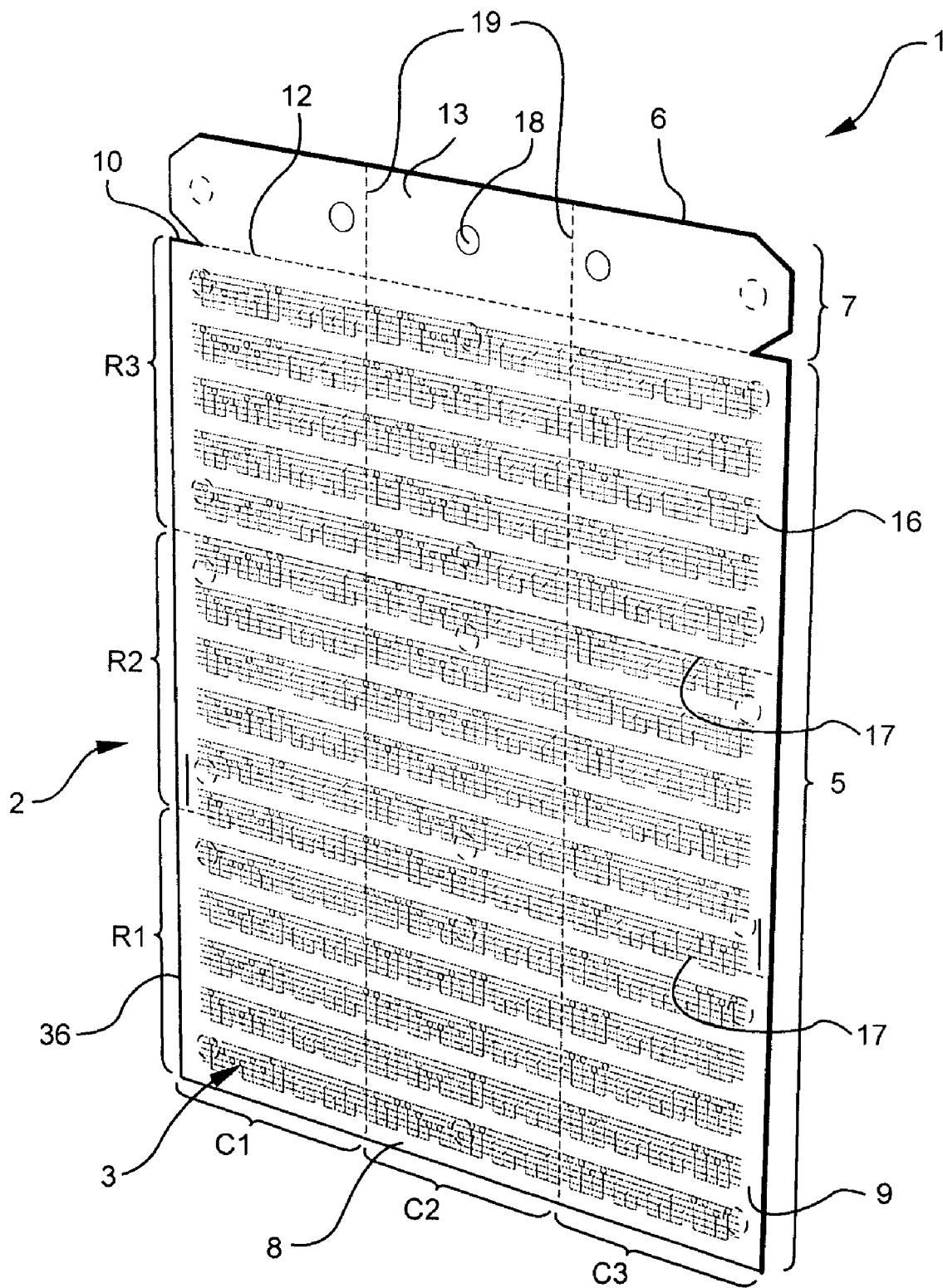
FIG. 1 is a perspective view of the front of a learning device according to an embodiment of the invention.

FIG. 1 discloses an embodiment of a learning device for displaying indicia in a way that effectuates productive reading and learning in a solitary or group environment without interruptions or discontinuities in the presentation of indicia. More particularly, it relates to a device that facilitates reading, learning and playing music notation as well as reading and learning music-related indicia. Among the advantages of the learning device is the ability to facilitate collaborative learning among a group of individuals, particularly musicians working together to learn an entire song during a rehearsal session. The learning device displays indicia on a poster and eliminates page-turn interruptions and discontinuities inherent in traditional multiple-page display formats. This is particularly useful to musicians needing both hands on the instrument at all times and drastically improves the ability of musicians to learn an entire song. The poster also eliminates the need for collaborating musicians to use numerous music stands to hold multiple copies of the same music notation. In addition, because the poster hangs flatly in a planar configuration, the frustration of dealing with contorted music notation bound together by a stiff spine is eliminated.

The learning device also includes a self-standing configuration to buttress the device so as to display the indicia in an upright manner when the device is not being used in its poster configuration. This eliminates the need for an external support device, such as a music stand, and is particularly advantageous for those individuals with no access to such a device. For example, many musicians spend months at a time traveling from performance to performance and do not have the means for, or do not want the inconvenience of, transporting a separate stand for holding music notation. The learning device may also include a storage pocket configuration, which provides for storing and organizing loose papers and optionally folds into a pocket folder configuration. The pocket folder configuration provides for easy, compact transport and storage of the learning device.

As used herein, the term "indicia" includes any visual or sensory representation, including but not limited to words, graphics, symbols, marks, figures, images and texture, relating to any desired subject matter, including but not limited to music, math, English, history, chemistry or physics. The term "equal dimensions," referred to when describing a panel, row or column of the learning device, means that each panel, row or column has approximately the same width and height.

Here, the term "width" refers to horizontal distance and the term "height" refers to vertical distance as shown in the foregoing drawings.

The term "indicia relating to music" denotes music notation, including but not limited to, music notation for a single song for a single instrument, music notation for an ensemble, music notation for a large group, i.e., an orchestra, and music notation for several instruments, i.e., a musical score. "Indicia relating to music" also encompasses information on music groups, artists, instruments and other music equipment used by such artists, as well as album graphics, artist biographies and photographs of the music group or artist.

The term "sheet" means any piece of material that is thin in comparison to its width and height, as shown in the foregoing drawings. The sheet may be any shape suitable to achieve the objectives as described herein, including but not limited to, rectangular, oval and circular. Examples of acceptable sheet materials include, but are not limited to, paper, cloth, wood, plastic or other natural or synthetic materials. The term "contact" encompasses planar contact, edge contact or any other type of contact, touching, union or junction of surfaces that achieves the objectives as described herein. The term "across substantially the entire," in reference to the arrangement of indicia on the learning device, denotes indicia that extends across a majority of at least one of the surfaces of the learning device such that a small space exists between the vertical edges of the learning device and where the indicia stops. The term "transparent" means having the ability to transmit light so that objects or indicia lying beyond are visible. Here, the transparent material may be colorless or colored, so long as the indicia lying beyond is visible.

Figure 4:
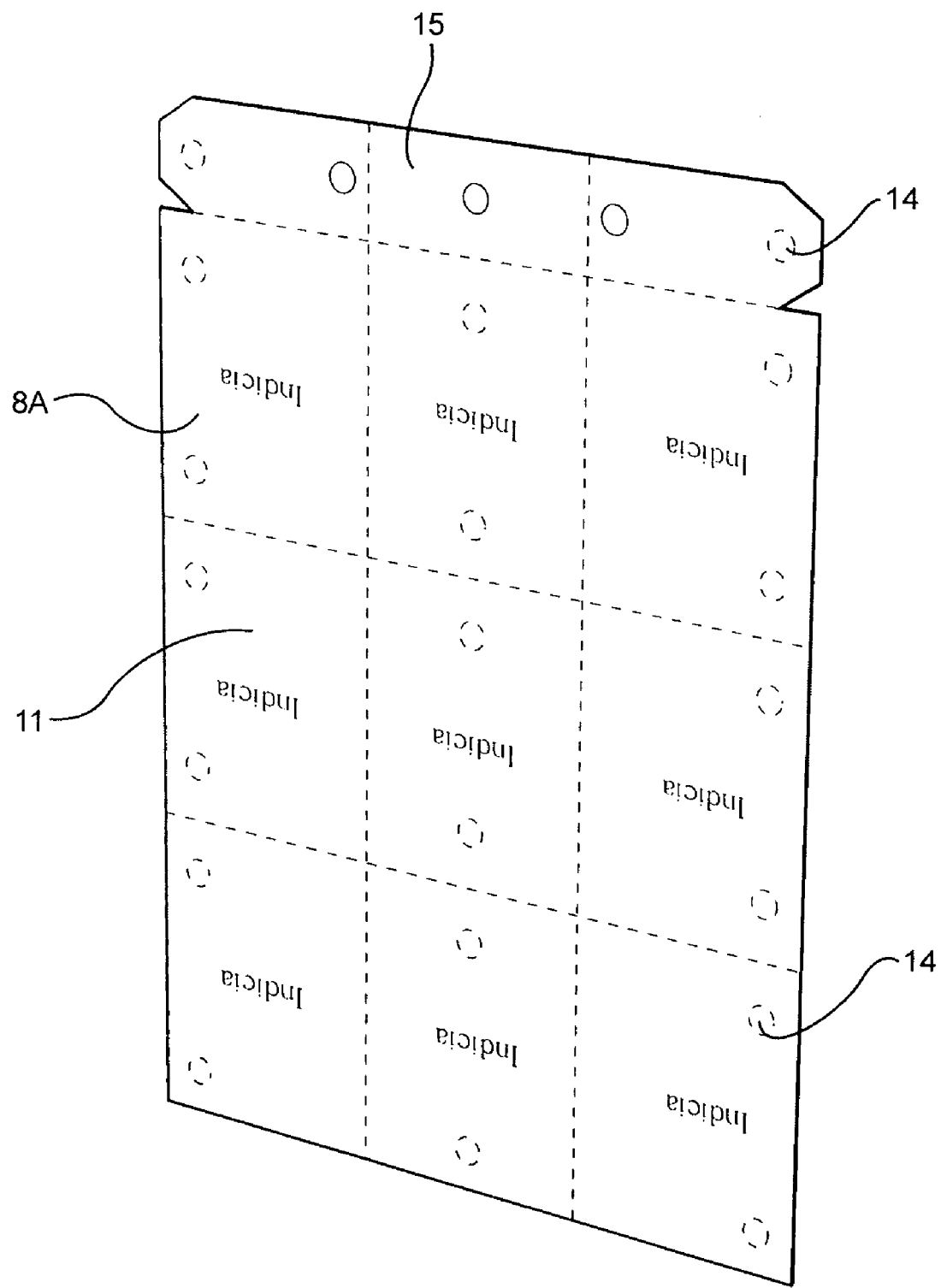
FIG. 4 is a perspective view of the back of a learning device according to an embodiment of the invention.

An embodiment of the invention is illustrated in the drawings. As shown in FIG. 1, the learning device 1 has at least one sheet 3 that comprises a main image portion 5 and a hanging portion 7. As mentioned above, the sheet 3 may be any suitable shape and material, including but not limited to, paper of any thickness suitable for achieving the objectives as described herein. Referring to FIGS. 1 and 4, the main image portion 5 has a front surface 9 and a back surface 11 and the hanging portion 7 has a front surface 13 and a back surface 15.

The learning device may have any suitable construction. In the illustrative embodiment, and with specific reference to the perspective view in FIG. 1, the learning device 1 is constructed with two sheets 3 having two horizontal edges 6 and two vertical edges 36. The learning device 1 has two first folds 17 horizontally traversing the main image portion 5 to define a bottom row R1, middle row R2 and top row R3. The first folds 17 are spaced such that the bottom row R1, middle row R2 and top row R3 are of approximately equal dimensions. The learning device 1 also has two second folds 19 perpendicular to the first folds 17 and vertically traversing the main image portion 5 and the hanging portion 7 to define a left column C1, middle column C2 and right column C3. The second folds 19 are spaced such that the left column C1, middle column C2 and right column C3 are of approximately equal dimensions. The first folds 17 intersect the second folds 19 to form a grid of nine panels 8 having approximately equal dimensions. It has been found that rows, columns and panels of approximately equal dimension function particularly well to achieve the objectives as described herein. Nonetheless, rows, columns and panels of unequal dimension may be suitable so long as they function to achieve the objectives as described herein. The learning device 1 may, of course, include many other combinations of rows and columns so long as the main image portion 5 has at least three rows and at least one column to achieve the objectives as described herein.

The hanging portion 7 is located along an edge 10 of the main image portion 5 and foldable toward the main image portion 5 about an edge fold 12. The hanging portion 7 may contain at least one aperture 18 for hanging the learning device 1. As shown in FIG. 1, the hanging portion 7 has three apertures 18 for hanging the learning device 1, wherein any one aperture 18 may be used alone or in combination with either or both of the other two apertures. The learning device 1 may be hung from a wall, ceiling or any other suitable support using the apertures alone or in conjunction with a hanging device, such as a string, metal wire or hook or any other suitable hanging device. Moreover, the learning device may be hung without using the apertures but, rather, using adhesive, nails, tacks or any other suitable attaching means.

The learning device 1 may also assume a variety of configurations. FIGS. 1 and 4 show the learning device 1 in a poster configuration 2. In this configuration, the learning device 1 is completely unfolded and displays indicia in one large view on the front surface 9 of the main image portion 5 and in one large view on the back surface 11 of the main image portion 5. Indicia may be displayed on the front surface 13 and back surface 15 of the hanging portion 7 as well. The size of the learning device 1 may vary depending on the needs of the user. The learning device 1 should be large enough to clearly display the indicia. It has been found, for example, that a learning device 1 having a total width, i.e., length of the horizontal edge 6, of at least 25 inches and a total height, i.e., length of the vertical edge 36, of at least 37 inches, with the main image portion 5 having a width of at least 25 inches and a height of at least 33 inches, functions particularly well. It will be appreciated, however, that the total size of the learning device 1, as well as the individual main image portion 5 and hanging portion 7 sections, may be of any suitable dimensions so long as the indicia is clearly visible to facilitate efficient and improved reading and learning.

The indicia of the embodiment in FIG. 1 may relate to music. In the illustrative embodiment, as shown in FIG. 1, the main image portion 5 contains music notation 16 which extends horizontally across substantially the entire front surface 9. Notably, the music notation 16 is not arranged separately within each panel 8 but, rather, is one composite image. In other words, the indicia extends continuously across the first folds 17 and the second folds 19, with no discontinuity in the indicia between the panels 8. The music notation 16 can be oriented in any way but is shown in FIG. 1 as to be read left to right and top to bottom when the learning device 1 is hung from the apertures 18. Common forms of music notation are standard notation, i.e., notes and other symbols placed on a music staff, and tablature notation. However, any form of music notation may be used. The front surface 9 may have the music notation 16 for one entire song. This enables a musician to learn and play a particular song from start to finish without ever removing a hand from the instrument.

Referring to FIG. 4, the back surface 11 of the main image portion 5 displays indicia arranged separately within each panel 8 on the back surface 11 such that no indicia extends from one panel to another. The music indicia on the back surface 11 may relate to the song and the artist of the song displayed on the front surface 9. That is, one panel 8 may contain photographs of an artist with a short biography while another panel contains a transcribed guitar solo. Other examples of such indicia include, but are not limited to, a transcription of a guitar solo for the song, a brief music lesson applicable to the song, photographs of the artist, an album cover, the guitar and amplifier used by the artist when recording the song, biographical information on the artist and interesting facts about how and when the song was written. As mentioned above, it should, of course, be appreciated that the indicia is not limited to music notation and other music-related indicia but, rather, encompasses any type of indicia. For example, other types of indicia include, without limitation, letters and words of the alphabet or math, chemistry or physics equations for learning in the classroom environment and/or practicing at home.

Figure 2:
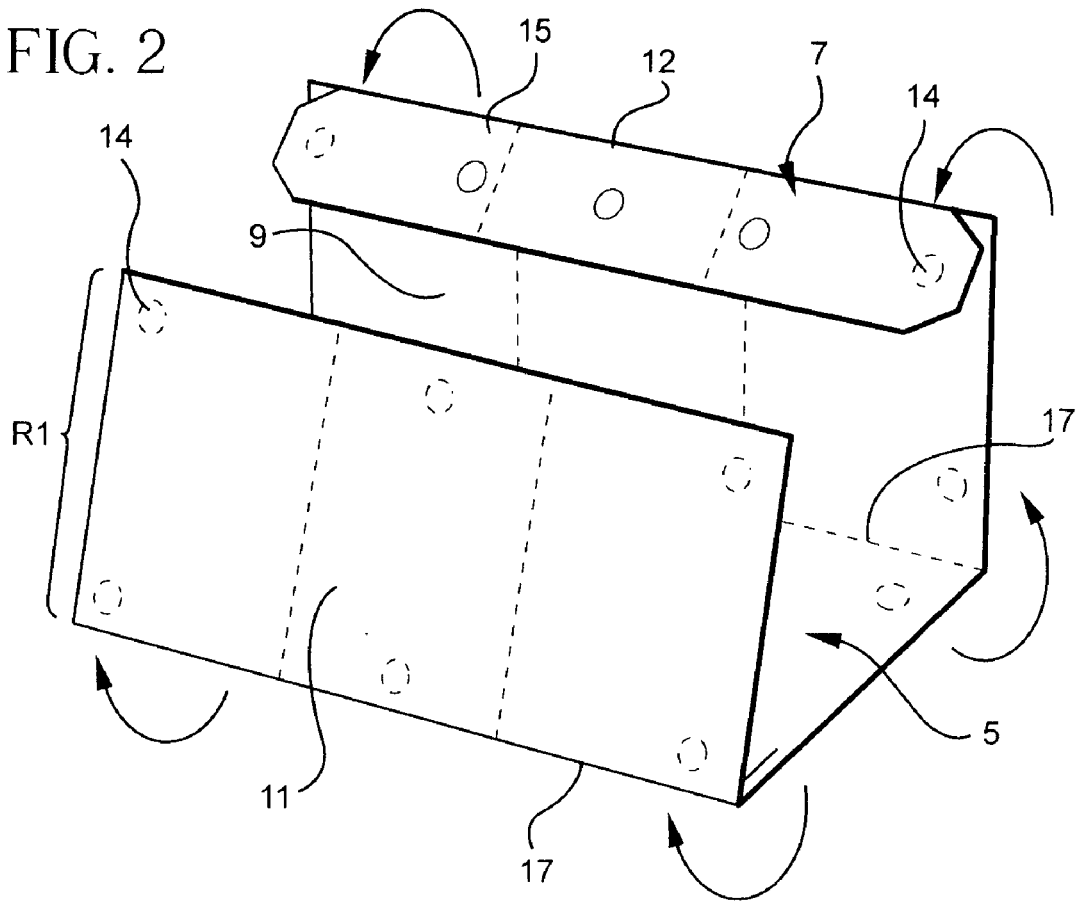
FIG. 2 is a perspective view illustrating an embodiment of the invention being folded into a self-standing structure.
Figure 3:
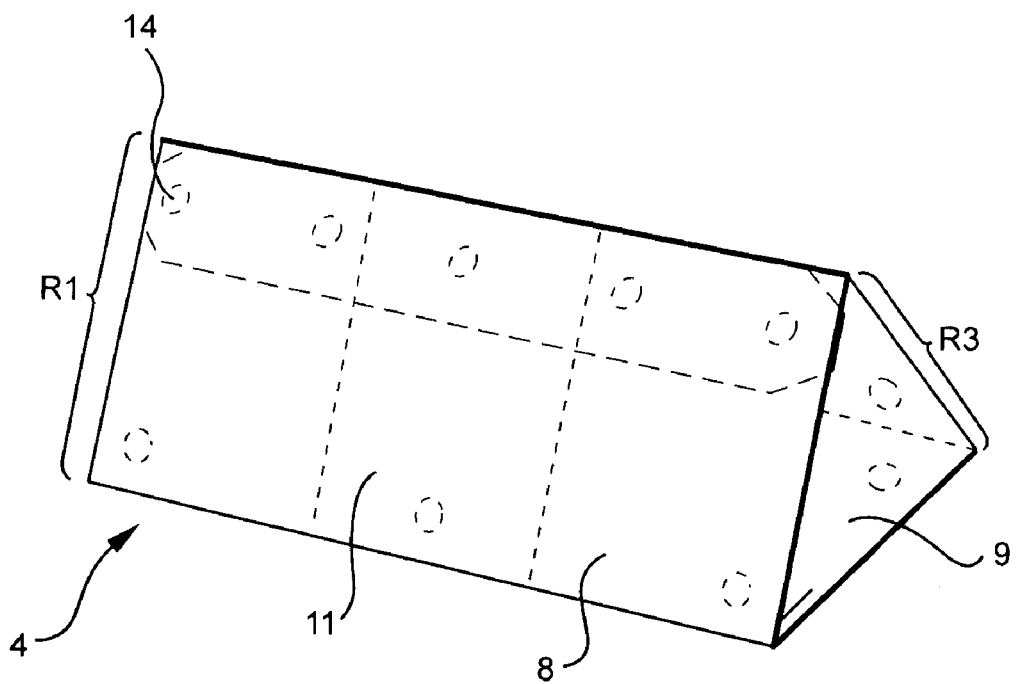
FIG. 3 is a perspective view of the self-standing structure formed in FIG. 2.

As shown in FIGS. 1-4, the learning device 1 is transformable between a poster configuration 2 and a self-standing configuration 4. Referring to FIGS. 2 and 3, the main image portion 5 folds about the first folds 17 and the hanging portion 7 folds about the edge fold 12 to cause the front surface 9 of the bottom row R1 to be in contact with the back surface 15 of the hanging portion 7. Although FIG. 3 illustrates the occurrence of planar contact between the two surfaces, any type of contact that achieves the objectives as described herein is possible. For instance, edge contact between the front surface 9 and back surface 15 may be releasably maintained if a suitable fastening device 14 is provided.

A fastening device 14 is used to releasably maintain the contact between the front surface 9 and the back surface 15. In the illustrative embodiment, magnets are positioned between the two sheets 3 on the main image portion 5 and the hanging portion 7. The magnets are oriented with like magnetic poles facing in the same direction, i.e., all north poles facing toward the front surfaces 9 and 13 or all north poles facing toward the back surfaces 11 and 15, so that opposite magnetic poles are facing each when the learning device 1 is folded. For example, if all north poles are facing toward the front surfaces 9 and 13 and the main image portion 5 and the hanging portion 7 are folded as shown in FIGS. 2 and 3, the north poles of the magnets in the main image portion 5 will be facing the south poles of the magnets in the hanging portion 7. Because it is well-known in the art that opposite poles attract, the two magnets will be pulled into indirect contact, i.e., through two sheets 3, to releasably hold the front surface 9 and the back surface 15 together. As shown in FIGS. 2 and 3, the main image portion 5 may have two magnets positioned in the bottom corners of the bottom row R1 so as to align with two magnets in the hanging portion 7 upon formation of the self-standing configuration 4.

The surfaces of the learning device 1 may also be fastened using a wide variety of fastening devices 14 other than magnets, including but not limited to, hook-and-loop fasteners, e.g., as disclosed in U.S. Pat. No. 2,717,437 incorporated herein by reference, tab-slit joints, adhesives, snaps, clips, hooks, latches, locks, folds or and any other fastening devices 14 suitable for maintaining releasable contact between the surfaces of the learning device 1. As such, the fastening devices 14 may be fixed on the outside surfaces, i.e., the front surface 9 and back surface 11 of the main image portion 5 and the front surface 13 and back surface 15 of the hanging portion 7, such as when the learning device 1 is constructed of only one sheet 3. Moreover, the learning device 1 may include, without limitation, holes, eyelets, slits or some other type of aperture to accommodate hooks, latches, locks and other similar fastening devices 14. The fastening devices 14 may be placed at any location on the learning device 1 so long as contact is releasably maintained as shown in the foregoing drawings and described herein.

The self-standing configuration 4 shown in FIG. 3 is triangular and outwardly displays the back surface 11 of the bottom row R1 and the back surface 11 of the top row R3. The structural shape of the self-standing configuration 4 may, of course, vary depending on the number of rows contained on the main image portion 5. The self-standing configuration 4 can also be easily flipped to outwardly display any two rows of the main image portion 5. In one embodiment, the back surface 11 displays indicia relating to music that is separately arranged within each panel 8. For example, the bottom row R1 shown in FIG. 3 may contain a guitar solo transcription in one panel, an artist biography in another panel and a related music lesson in the third panel. Notably, the indicia contained within each panel is oriented in the same direction so as to always display the indicia in a right-side-up direction when the learning device 1 is flipped to view another row of panels 8. The self-standing configuration 4 may, alternatively, be formed with the front surface 9 outwardly displayed or with the back surface 11 outwardly displaying music notation that extends across substantially the entire back surface 11.

Advantageously, the self-standing configuration 4 displays indicia in a substantially upright view and eliminates the need to use an external support device, such as a music stand, when the poster configuration 2 is not in use. The self-standing configuration 4 is useful for learning at a desk, while sitting on a couch or bed or during transit in a car, plane, train, bus or other mode of transportation. This configuration is particularly useful for musicians who travel from performance to performance and do not have access to, or want the inconvenience of, transporting a music stand on a tour bus, into a hotel room or to and from rehearsal.

Figure 5:
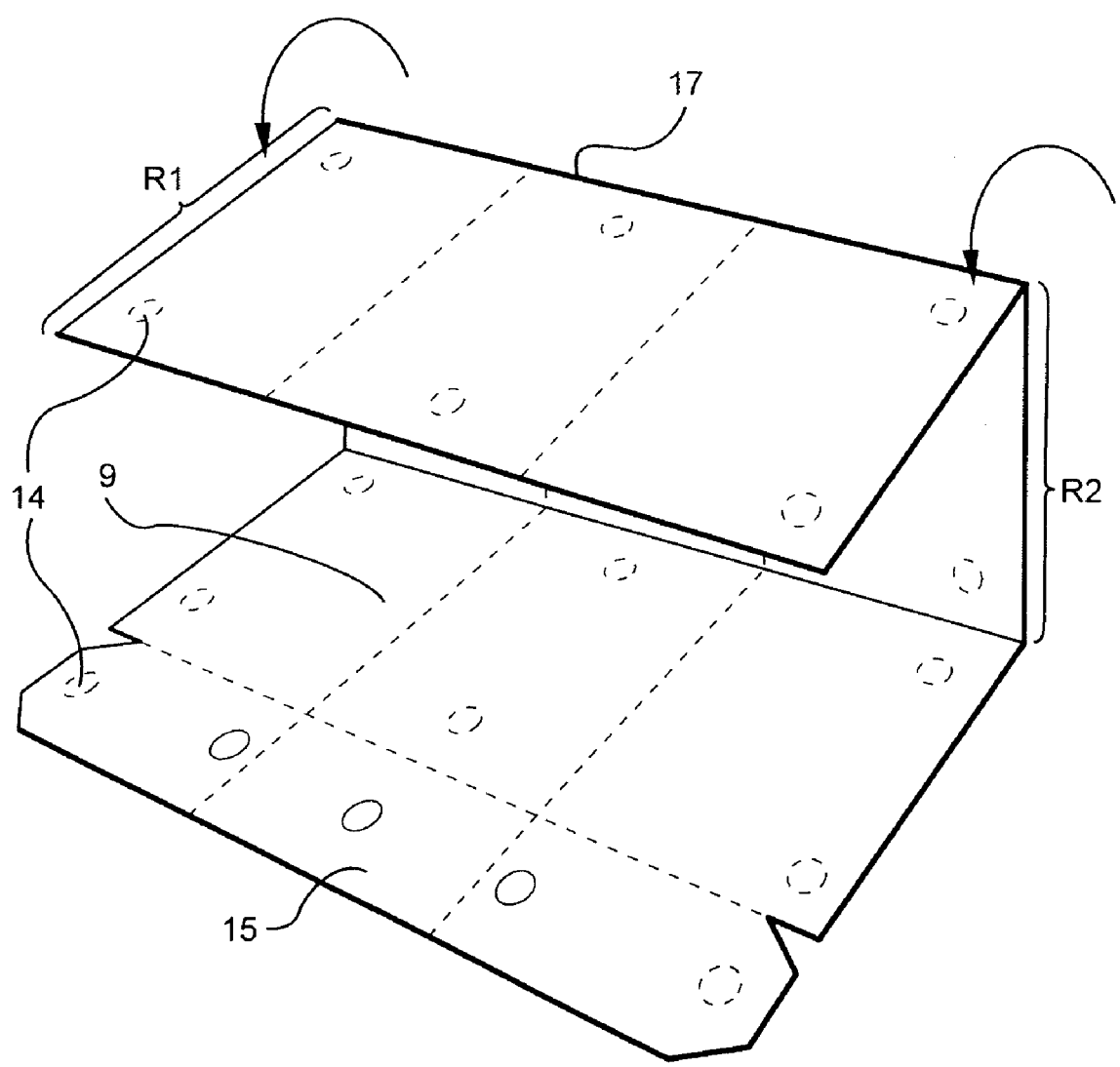
FIGS. 5-8 are perspective views illustrating an embodiment of the invention being folded into one row having a storage pocket.
Figure 6:
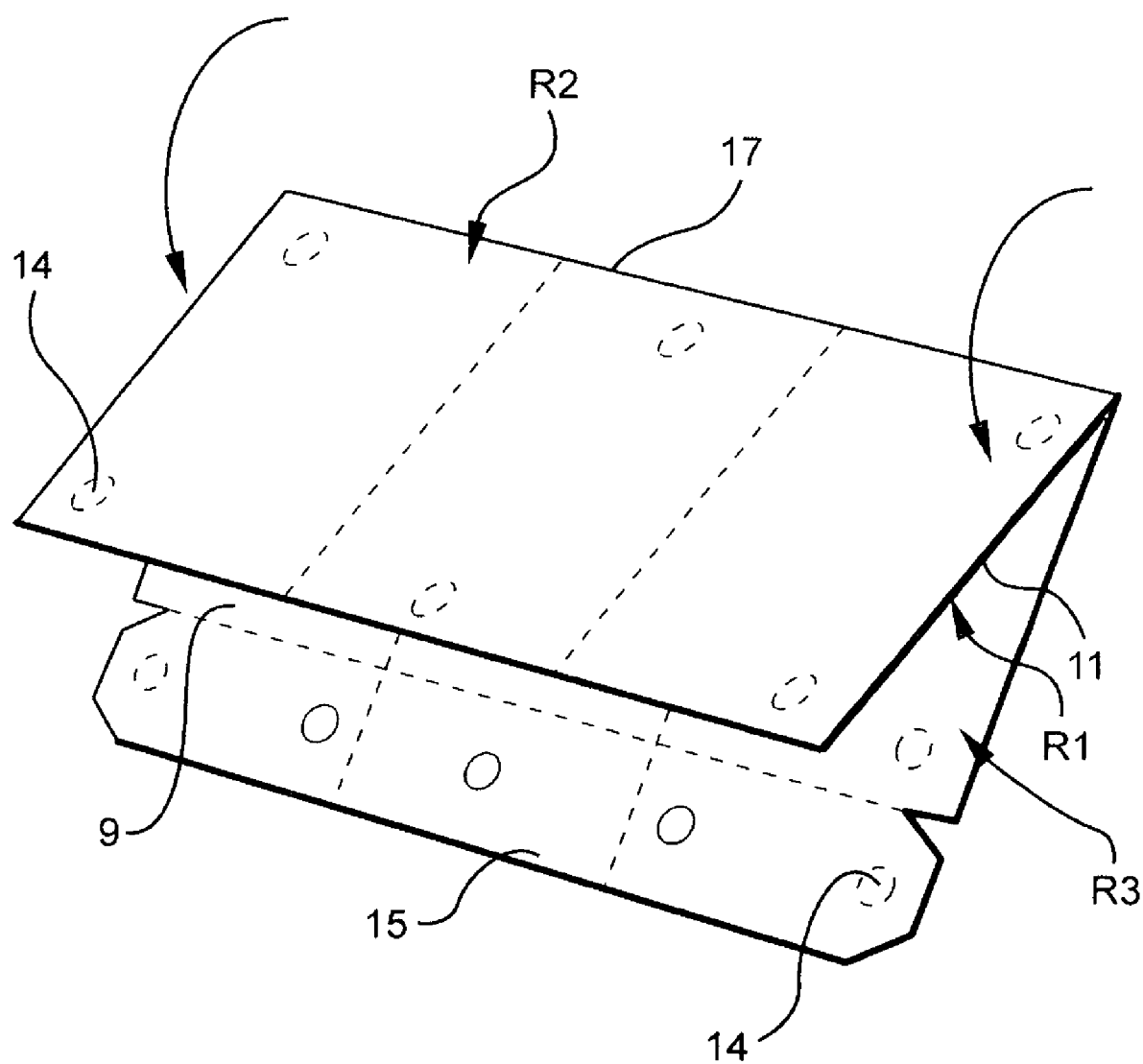
Figure 7:
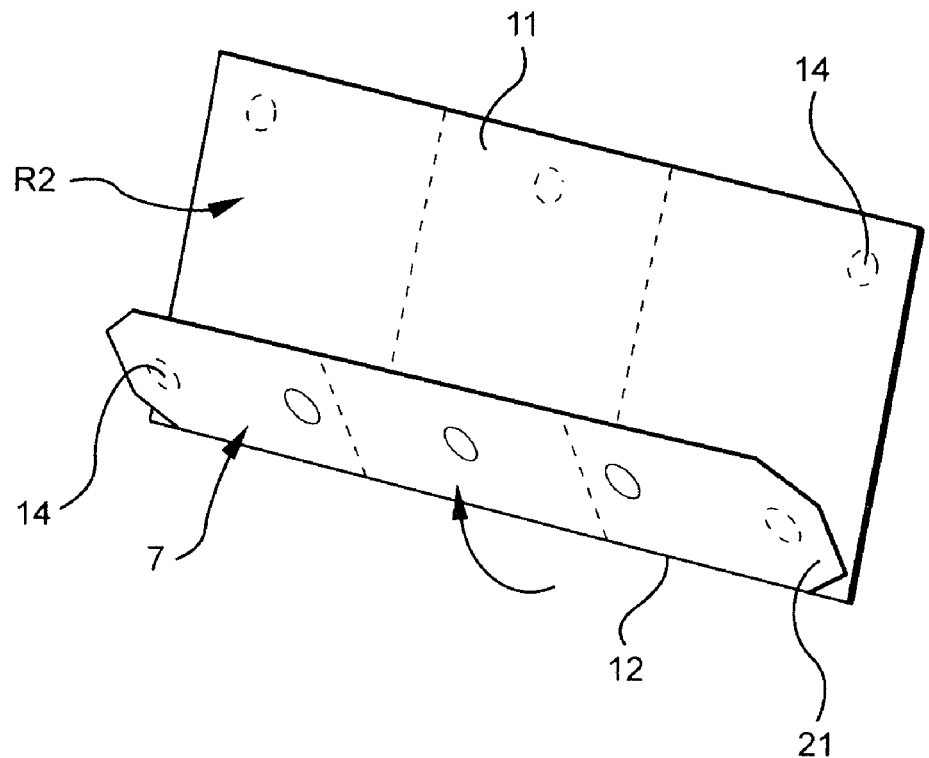
Figure 8:
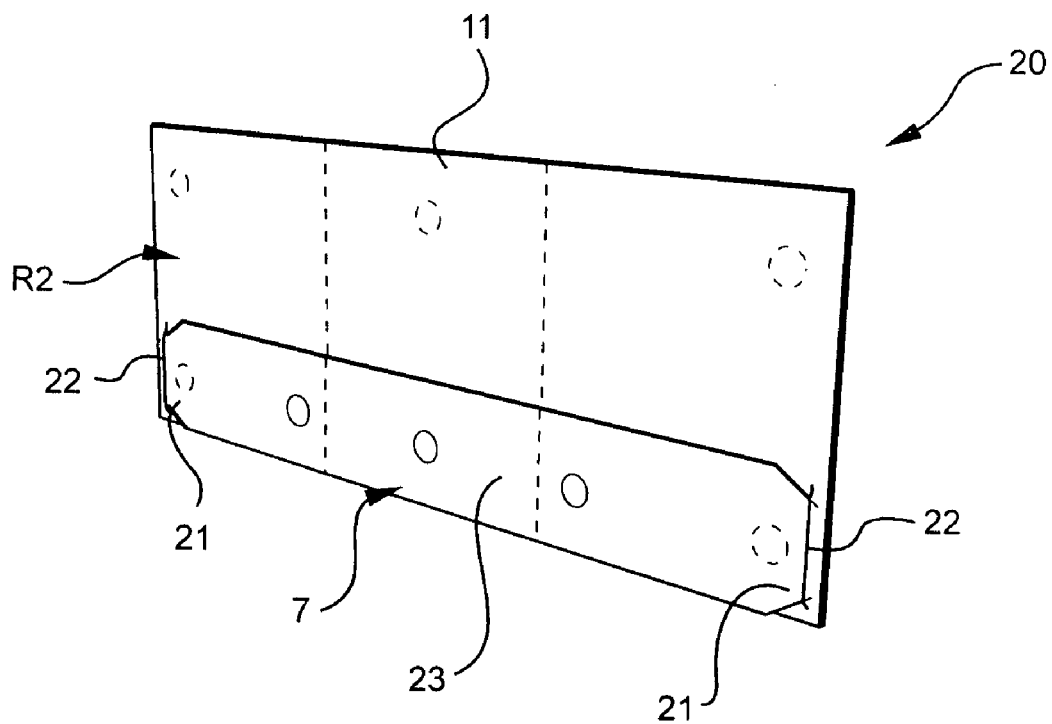

FIGS. 5-8 illustrate the transformation of the learning device 1 into a storage pocket configuration 20. Referring first to FIG. 5, the learning device 1 folds about a first fold 17 to cause the front surface 9 of the bottom row R1 to be in contact with the front surface 9 of the middle row R2. As shown in FIG. 6, the learning device 1 folds about a first fold 17 to cause the back surface 11 of the bottom row R1 to be in contact with the front surface 9 of the top row R3. As shown in FIGS. 7 and 8, the main image portion 5 of the illustrated embodiment consists of one row, i.e., three rows folded upon one another. FIG. 7 shows the hanging portion 7 folding about the edge fold 12 to cause the front surface 13 of the hanging portion 7 to be in contact with the back surface 11 of the middle row R2. In the illustrative embodiment, tabs 21 are provided at the ends of the hanging portion 7 and fit into slits 22 in the main image portion 5 to form tab-slit joints that secure the hanging portion 7 at its ends against the back surface 11 of the middle row R2. As described below with reference to FIG. 20, the learning device 1 may have additional tabs 21 and slits 22 for maintaining releasable contact between the surfaces of the device. Alternatively, or in addition to, the hanging portion 7 may be secured against the middle row R2 using other fastening devices 14, including but not limited to hook-and-loop fasteners, e.g., as disclosed in U.S. Pat. No. 2,717,437, adhesives, snaps, clips, hooks, latches, magnets, folds, locks or any other suitable fastener.

As shown in FIG. 8, securing the hanging portion 7 at its ends against the back surface 11 of the middle row R2 forms a storage pocket 23 that traverses the entire width of the main image portion 5. The hanging portion 7 may also traverse along only a portion of the entire width of the main image portion 5. Alternatively, the main image portion 5 may have only one or two columns and, therefore, form a storage pocket configuration 20 having only one or two panels 8. The storage pocket 23 is useful for storing loose papers or other items as well as maintaining organization of such papers and other items, particularly when the learning device 1 is stored or being transported. Although the storage pocket configuration 20, as shown in FIG. 8, is folded to outwardly display the back surface 11 of the middle row R2 and the top row R3, it will be appreciated that the storage pocket configuration 20 may be formed by folding the main image portion 5 about the first folds 17 in a variety of different ways so as to outwardly display different combinations of surfaces and rows.

Figure 9:
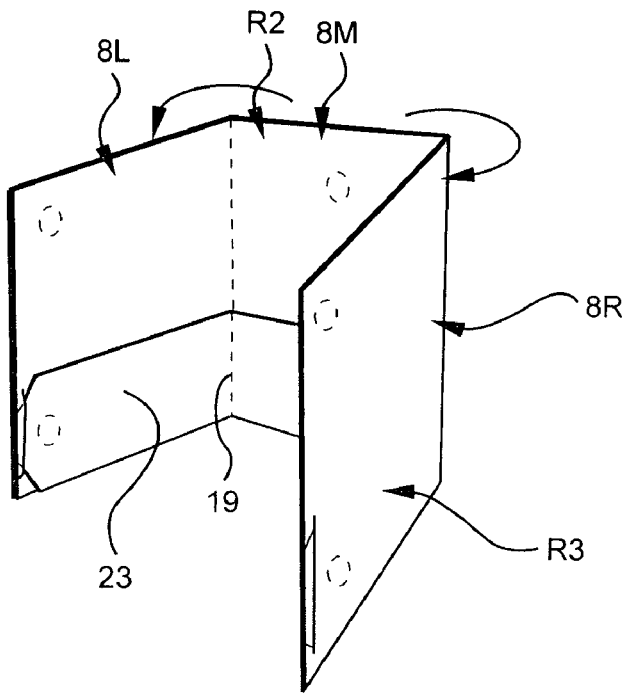
FIG. 9 is a perspective view of FIG. 8 being folded to form a pocket folder.
Figure 10:
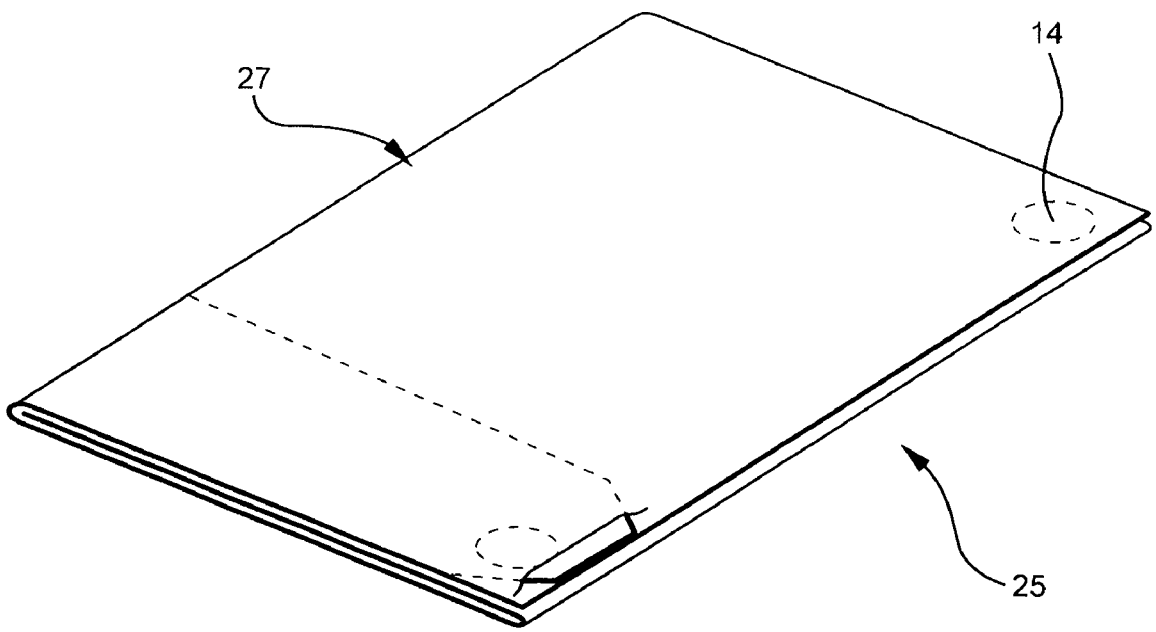
FIG. 10 is a perspective view of the pocket folder formed in FIG. 9.

FIGS. 9 and 10 illustrate the formation of a pocket folder configuration 25. This configuration, as shown in FIG. 9, is formed by folding the storage pocket configuration 20 of FIG. 8 about the second folds 19 to first cause the middle row side (R2) of a right outer panel 8R to be in contact with the middle row side (R2) of a middle panel 8M and next cause the middle row side (R2) of a left outer panel 8L to be in contact with the top row side (R3) of the right outer panel 8R. It should be appreciated that the pocket folder configuration 25 can only be formed when the storage pocket configuration 20 contains at least two panels 8, i.e., the main image portion 5 contains at least two columns.

In the illustrative embodiment, the learning device 1 forms a three-pocket pocket folder, as shown in FIG. 9. Notably, the pocket folder configuration 25 has the dimensions, i.e., width and height, of one panel 8. Thus, the learning device 1 provides not only a way for storing and organizing papers, but is transformable into a compact pocket folder size for conveniently storing and transporting the learning device 1. Furthermore, indicia may be arranged on the main image portion 5 so as to be displayed in a variety of ways when the learning device 1 is folded into the pocket folder configuration 25. For example, referring to the illustrative embodiment, particularly FIG. 4, the indicia within a leftmost panel 8A on the back surface 11 of the top row R3 may be an album cover corresponding to the music notation 16 on the front surface 9. When the pocket folder configuration 25 is formed according to FIGS. 5-9, the leftmost panel 8A is displayed as the top row side (R3) of the outer left panel 8L. In other words, the leftmost panel 8A becomes a front cover 27 of the pocket folder configuration 25.

In sum, FIGS. 1-10 illustrate an embodiment of the learning device 1 characterized by two sheets 3, two first folds 17 and two second folds 19 perpendicular to the two first folds 17. The illustrative embodiment is transformable between a poster configuration 2, self-standing configuration 4, storage pocket configuration 20 and pocket folder configuration 25. The main image portion 5 has a front surface 9 containing music notation 16 for one entire song that extends across substantially the entire front surface 9. The main image portion 5 also has a back surface 11 containing indicia relating to the music notation separately arranged within each of nine panels 8. One of the nine panels 8 is designed to be the front cover 27 of the pocket folder configuration 25 when the learning device 1 is folded into a configuration the size of a single panel 8.

Figure 11:
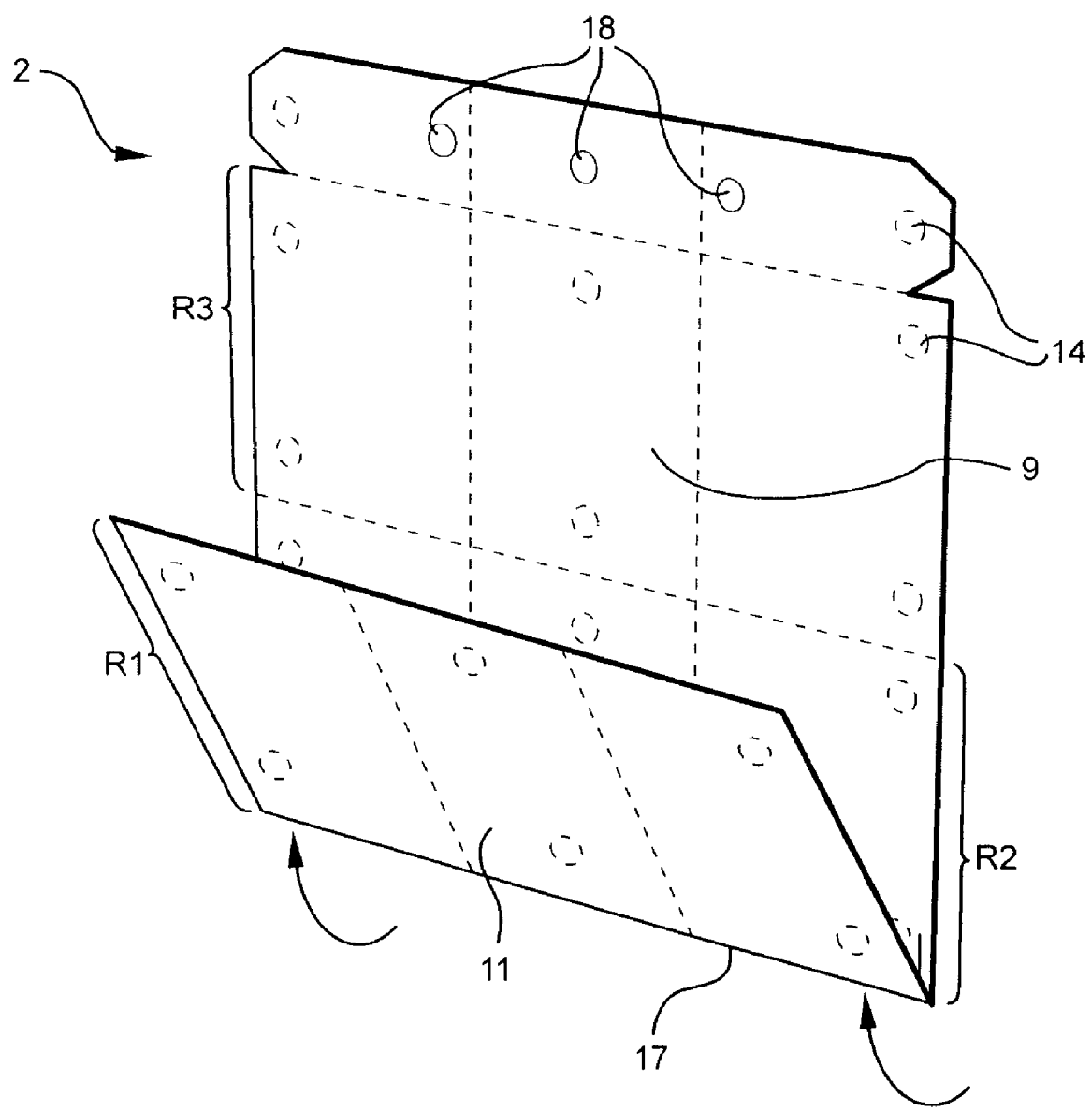
FIG. 11 is a perspective view of a learning device being formed into a display option according to an embodiment of the invention.
Figure 12:
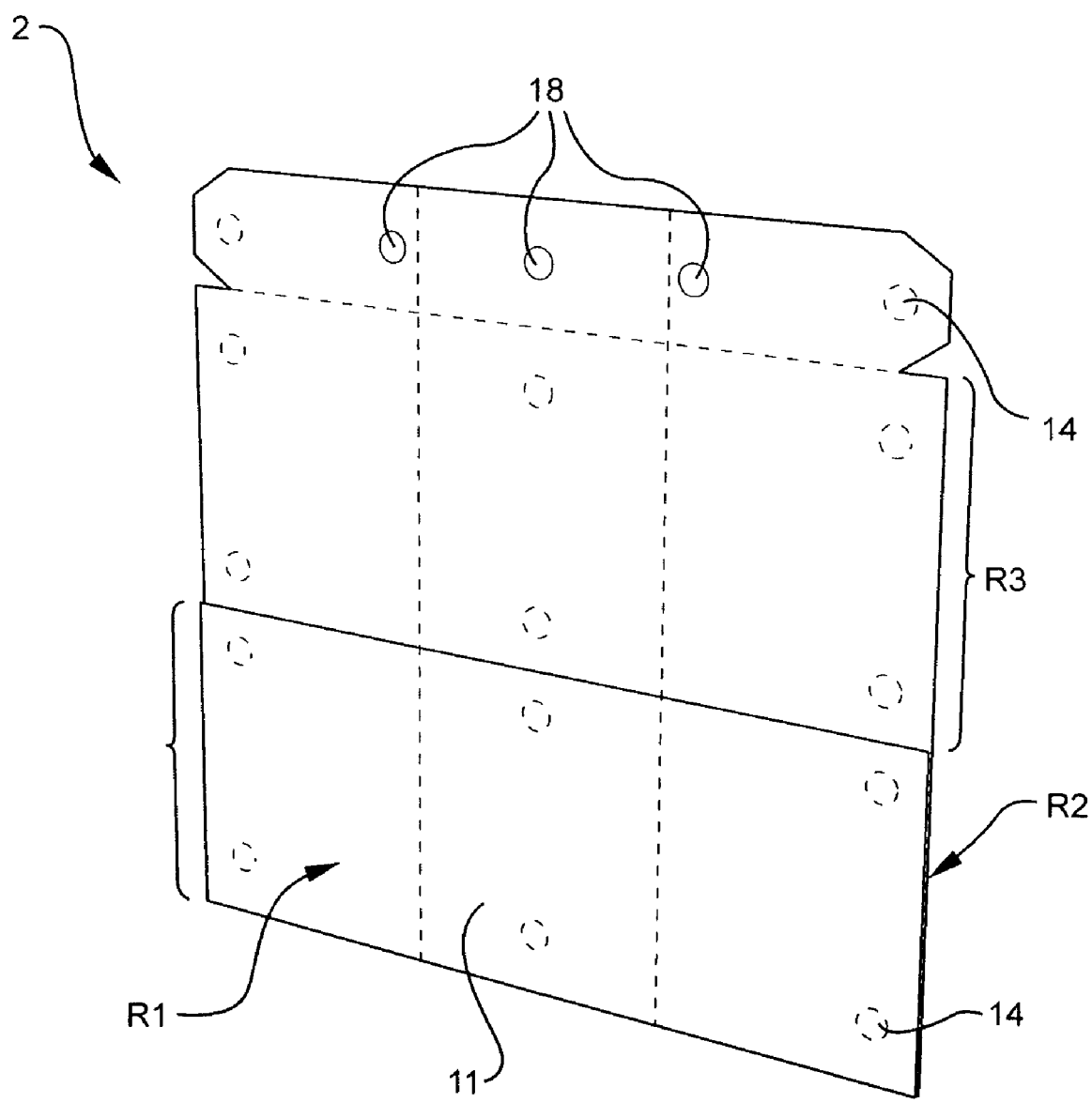
FIG. 12 is a perspective view of the display option formed in FIG. 11.

The poster configuration 2 provides several displaying options in addition to that shown in FIG. 1. In FIGS. 11 and 12, the main image portion 5 folds about a first fold 17 to cause the front surface 9 of the bottom row R1 to be in contact with the front surface 9 of the middle row R2. As shown in FIG. 12, the back surface 11 of the bottom row R1 is outwardly displayed in conjunction with the front surface 9 of the top row R3. This display option allows indicia located on opposite surfaces of the learning device 1 to be viewed simultaneously and, furthermore, eliminates the need to unhook or unfasten the learning device 1, flip it around and re-hang or refasten the device to view the other side. For example, if the panels 8 on the bottom row R1 contain music lessons or a guitar solo transcription for the song on the front surface 9, a musician simply flips the bottom row R1 up to reference both at the same time. The front surface 9 of the bottom row R1 is held in releasable contact with the front surface 9 of the middle row R2 by fastening devices 14, including but not limited to hook-and-loop fasteners, e.g., as disclosed in U.S. Pat. No. 2,717,437, tab-slit joints, adhesives, snaps, clips, hooks, latches, magnets and locks.

Notably, the indicia on the back surface 11 is positioned upside down within the panels 8 relative to the indicia on the front surface 9 so that such indicia on the back surface 11 can be viewed right-side-up when the front surface 9 of the bottom row R1 is folded upward against the front surface 9 of the middle row R2. Although the illustrated embodiment shows the indicia on the front surface 9 to be right-side-up when hung by the apertures 18 in the hanging portion 7, the learning device 1 may be configured such that the indicia is right-side-up on the back surface 11 when hung by the apertures 18.

Figure 13:
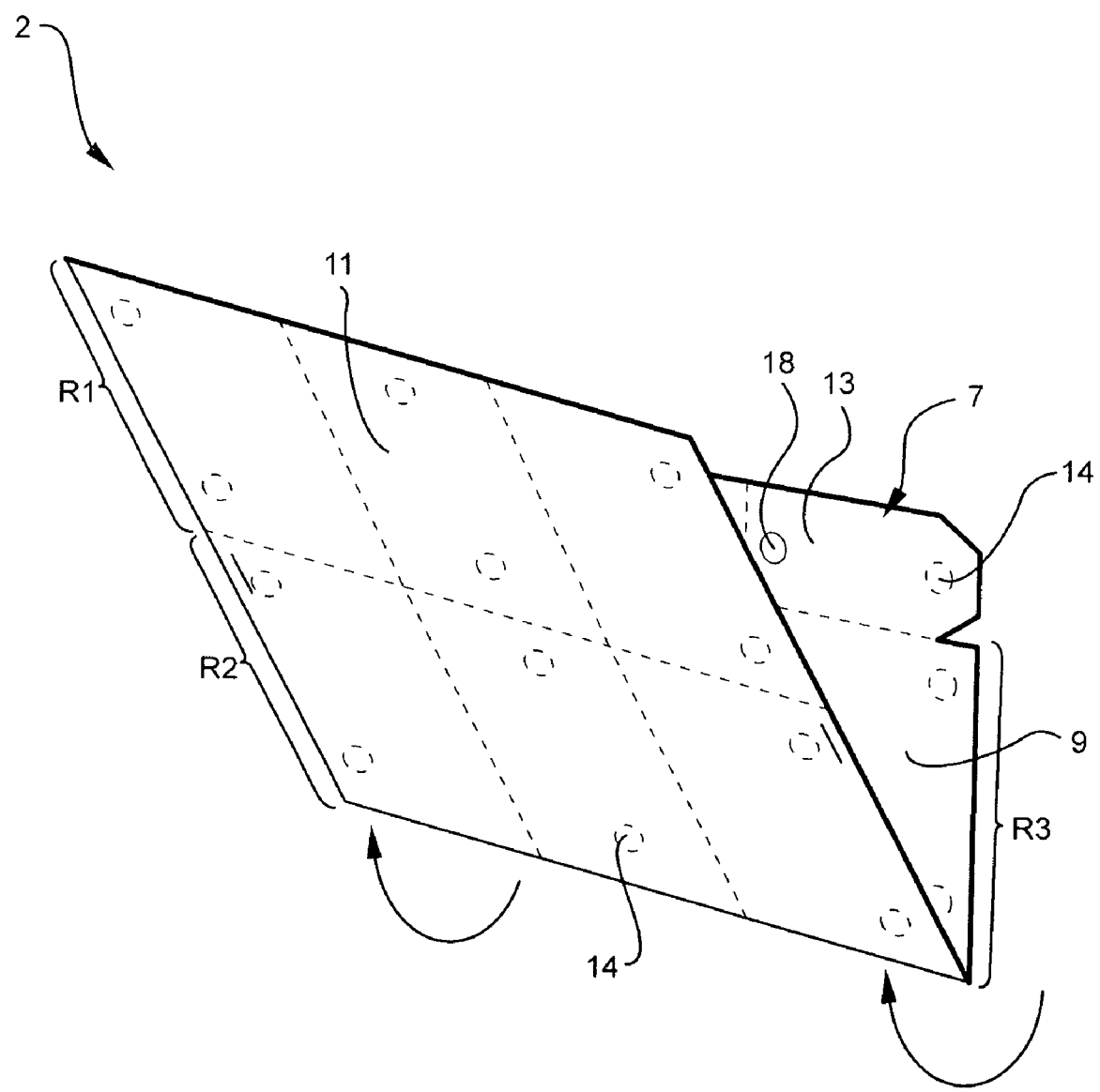
FIG. 13 is a perspective view of a learning device being formed into another display option according to an embodiment of the invention.
Figure 14:
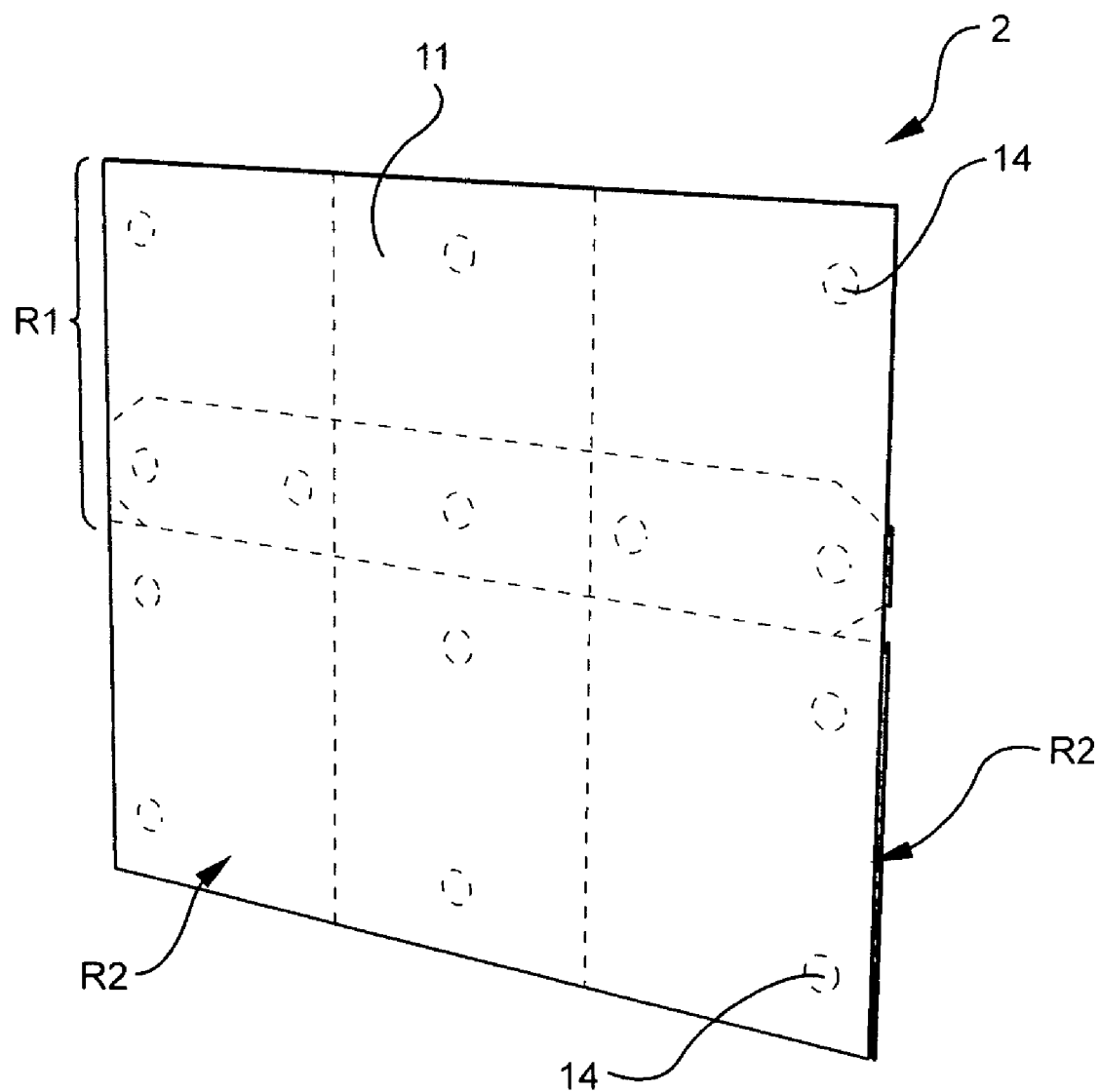
FIG. 14 is a perspective view of the display option formed in FIG. 13.

In FIGS. 13 and 14, the main image portion 5 folds about a first fold 17 to cause a portion of the front surface 9 of the bottom row R1 to be in contact with the front surface 13 of the hanging portion 7 and the front surface 9 of the middle row R2 to be in contact with the front surface 9 of the top row R3. As shown in FIG. 14, the back surface 11 of the bottom row R1 and the middle row R2 is outwardly displayed. This display option allows indicia on the back surface 11 to be viewed without needing to unhook or unfasten the learning device 1, flip it around and re-hang or refasten the device to view the other side. For example, if the panels on the bottom row R1 contain music lessons or a guitar solo transcription for a song, a musician simply flips the bottom row R1 and the middle row R2 upward to conveniently reference indicia on the back surface 11. The front surface 9 of the bottom row R1 and the middle row R2 is held in releasable contact with the front surface 9 of the middle row R2 and the front surface 13 of the hanging portion 7 by fastening devices 14, including but not limited to hook-and-loop fasteners, e.g., as disclosed in U.S. Pat. No. 2,717,437, tab-slit joints, adhesives, snaps, clips, hooks, latches, magnets and locks. As explained above, the indicia on the back surface 11 is positioned upside down within the panels 8 relative to the indicia on the front surface 9 to enable such indicia to be viewed right-side-up when the front surface 9 of the bottom row R1 and the middle row R2 is folded upward into position.

Figure 15:
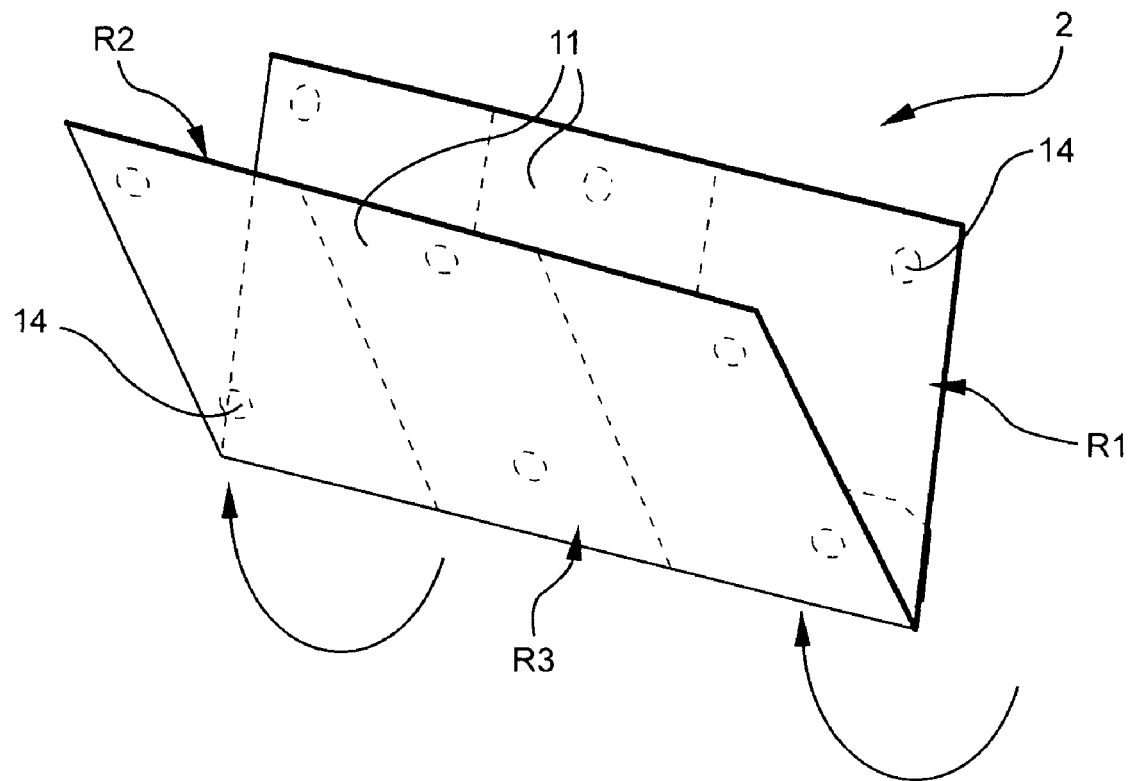
FIG. 15 is a perspective view of a learning device being formed into yet another display option according to an embodiment of the invention.
Figure 16:
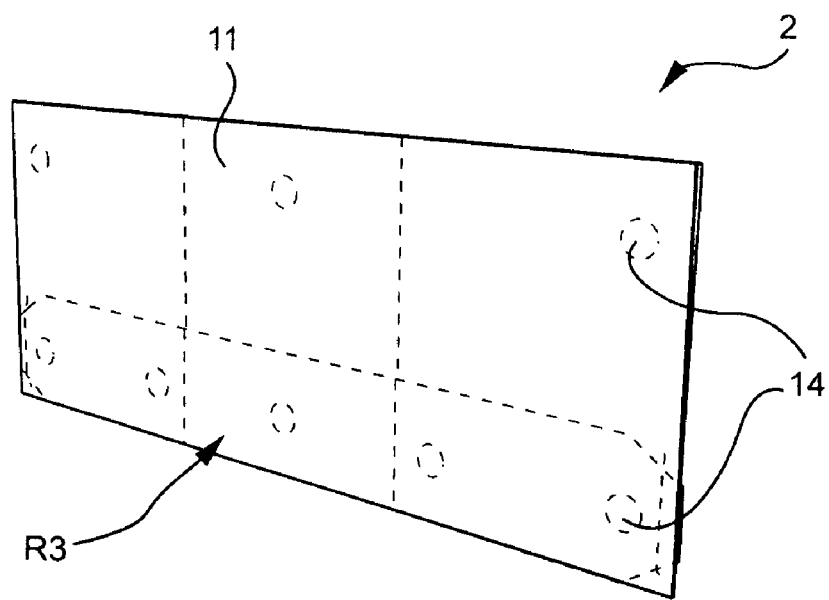
FIG. 16 is a perspective view of the display option formed in FIG. 15.

FIGS. 15 and 16 show an extension of the display option pictured in FIGS. 13 and 14. Here, the bottom row R1 and middle row R2 are folded upward about both a first fold 17 and the edge fold 12 to cause the back surface 11 of the middle row R2 to be in contact with the back surface 11 of the bottom row R1. As a result, the back surface 11 of the top row R3 is outwardly displayed, as shown in FIG. 16. This display option also allows indicia on the back surface 11 of the top row R3 to be viewed without needing to unhook or unfasten the learning device 1, flip it around and re-hang or refasten the device to view the other side. Each instance of contact occurring in this display option may be releasably maintained by fastening devices 14, including but not limited to hook-and-loop fasteners, e.g., as disclosed in U.S. Pat. No. 2,717,437, tab-slit joints, adhesives, snaps, clips, hooks, latches, magnets and locks. As explained above, the indicia on the back surface 11 is positioned upside down within the panels 8 relative to the indicia on the front surface 9 so that such indicia on the back surface 11 can be viewed right-side-up when the back surface 11 of the top row R3 is being viewed. It will farther be appreciated that display options in addition to those illustrated in FIGS. 11-16 may be formed, including but not limited to, outwardly displaying the front surface 9, instead of the back surface 11, by folding the learning device 1 in the manner shown in the figures or in some other suitable manner.

Figure 17:
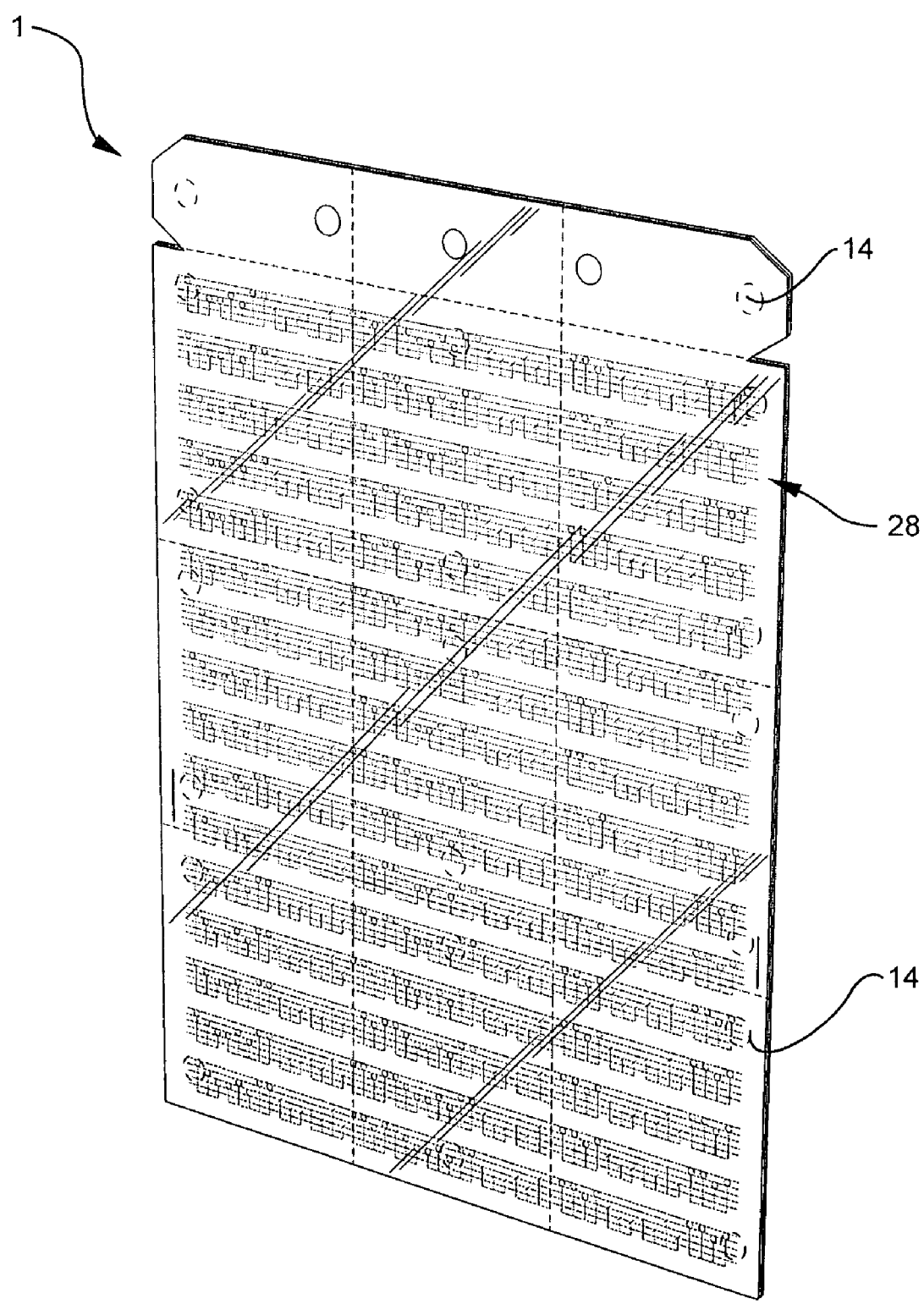
FIG. 17 is a perspective view of the device shown in FIG. 1 having transparent sheets.

The learning device 1 may be laminated, coated or covered with a transparent material or comprised of a synthetic material to increase durability of the device and provide a writable and erasable surface for making temporary notes or other markings. By way of example, FIG. 17 shows transparent sheets 28 fixed to the front surface 9 and back surface 11 of the main image portion 5 and the front surface 13 and the back surface 15 of the hanging portion 7. Such articles, as well as methods for making such articles, are disclosed in U.S. Pat. Nos. 6,063,227 and 5,868,429 to Raymond et al., U.S. Pat. No 5,273,432 to White and U.S. Pat. No. 5,063,637 to Howard Jr. et al. and are incorporated herein by reference.

Figure 18:
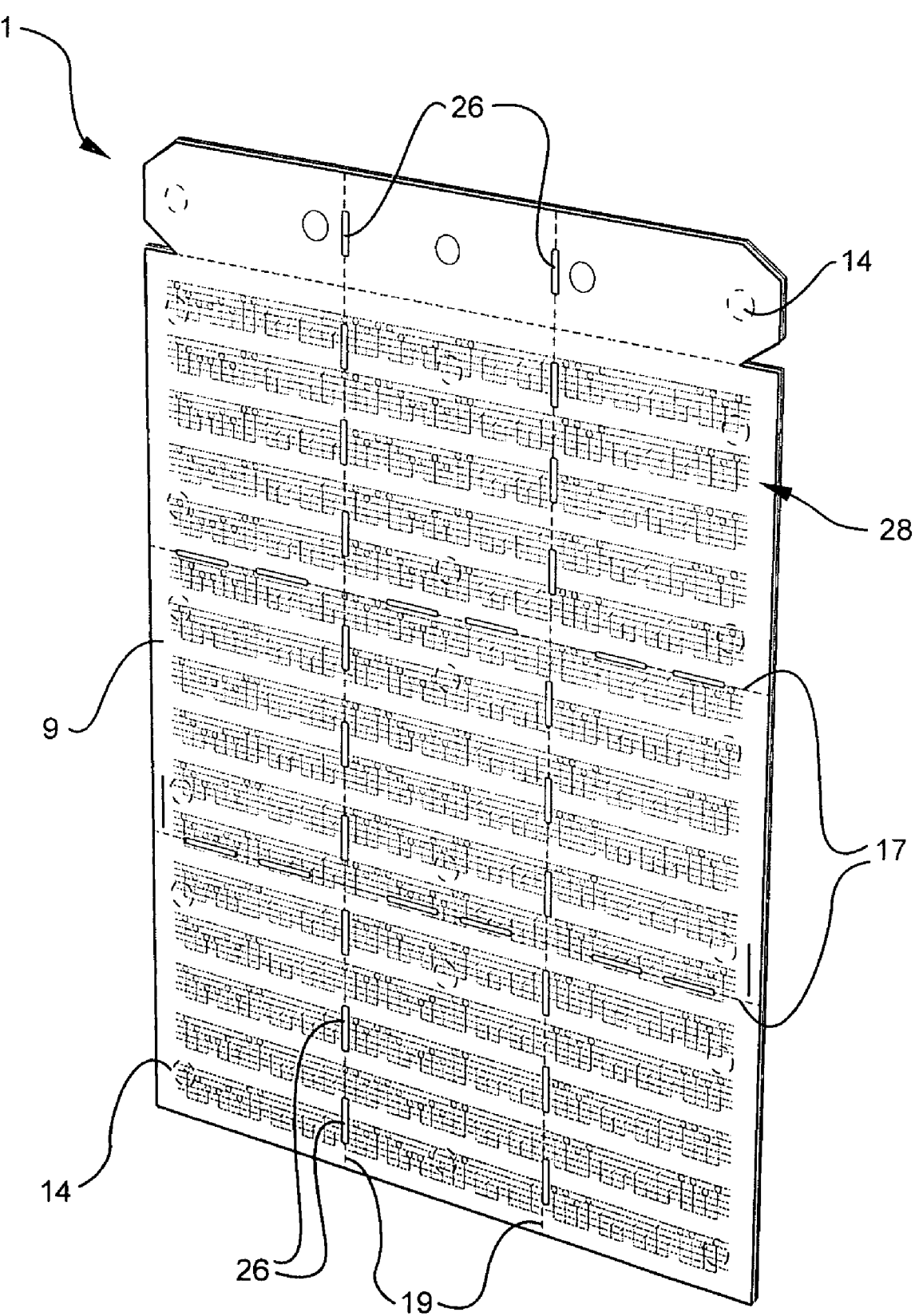
FIG. 18 is a perspective view of an alternative learning device according to another embodiment of the invention.

The first folds 17 and second folds 19 of the illustrative embodiment shown in FIGS. 1-17 are solid. Alternatively, the first folds 17 and second folds 19 may contain perforations 26, as shown in FIG. 18. Among the benefits of perforated folds are decreases in bending resistance relative to the weight of the panels 8, as well as a decrease in memory retention, i.e., the tendency of an unfolded structure to revert to its closed position. Examples of articles containing such perforations and methods for making such articles are described in U.S. Pat. No. 5,273,432 to White and U.S. Pat. No. 5,063,637 to Howard Jr. et al., which are incorporated herein by reference. The construction of the learning device 1 shown in FIG. 18 is usable in at least each of the configurations and display options illustrated in FIGS. 1-17 and discussed hereinabove. The perforated embodiment shown in FIG. 18 may also be laminated, coated or covered with a transparent material or comprised of a synthetic material to increase durability of the device and provide a writeable and erasable surface for making temporary notes or other markings. FIG. 18 shows transparent sheets 28 fixed to the front surface 9 and back surface 11 of the main image portion 5 and the front surface 13 and the back surface 15 of the hanging portion 7.

Figure 19:
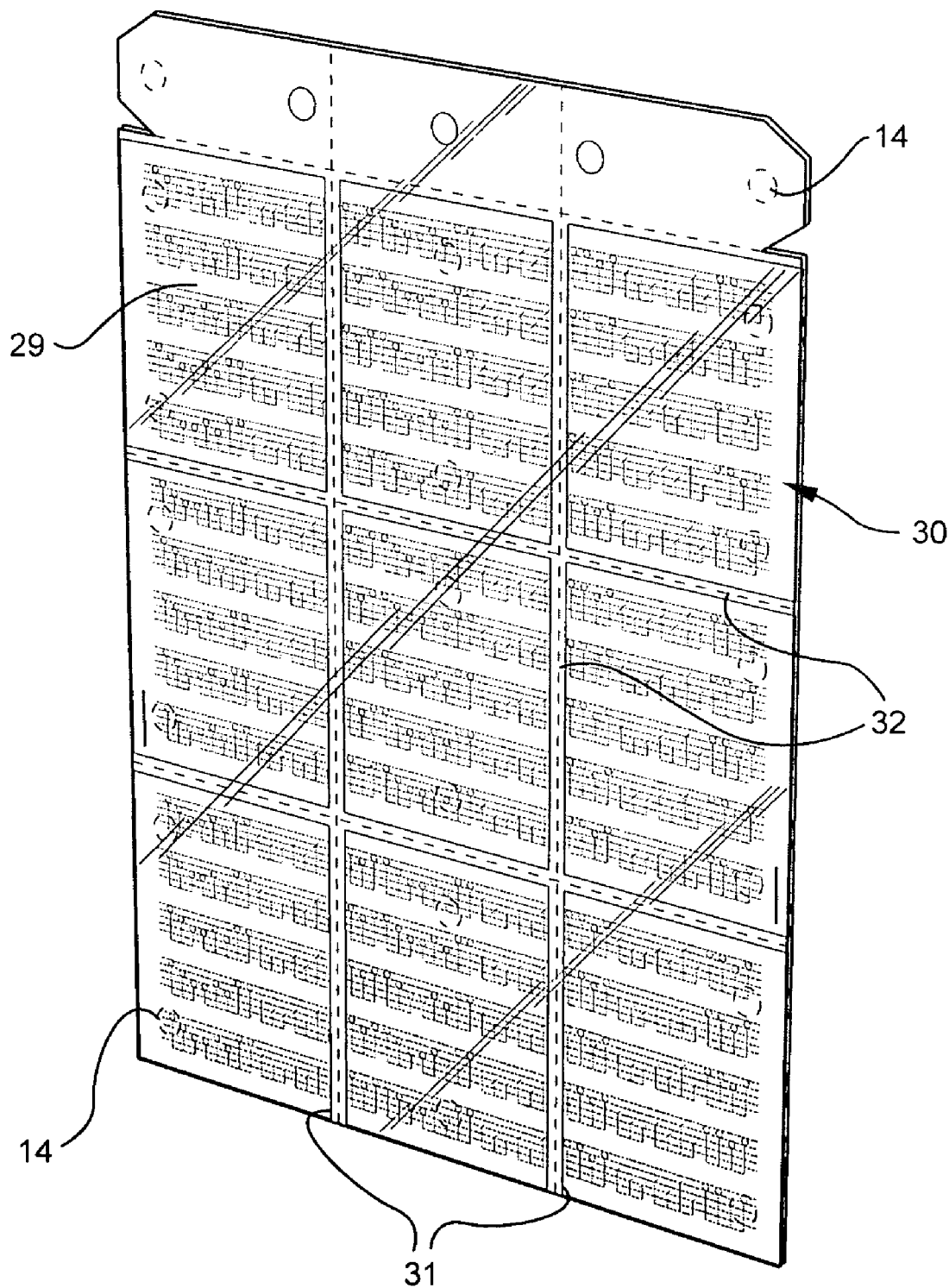
FIG. 19 is a perspective view of an alternative learning device according to the another embodiment of invention.

FIG. 19 shows another embodiment of the learning device 1. The learning device 1 is constructed using separate sheet panels 29 arranged in a grid configuration and fixed relative to one another by a flexible support material 30. The flexible support material 30 may be a set of laminating sheets, to which the panels 29 are fixedly attached, or any other flexible, transparent material that achieves the objectives as described herein. The panels 29 are arranged so as to provide gaps 31 between each panel 29. The gaps define fold lines 32 about which the learning device 1 is foldable. Examples of articles having such construction and methods of making such articles are described in U.S. Pat. Nos. 6,063,227 and 5,868, 429 to Raymond et al., which are incorporated herein by reference. The construction of the learning device 1 shown in FIG. 19 is usable in at least each of the configurations and display options illustrated in FIGS. 1-17 and described herein.

Figure 20:
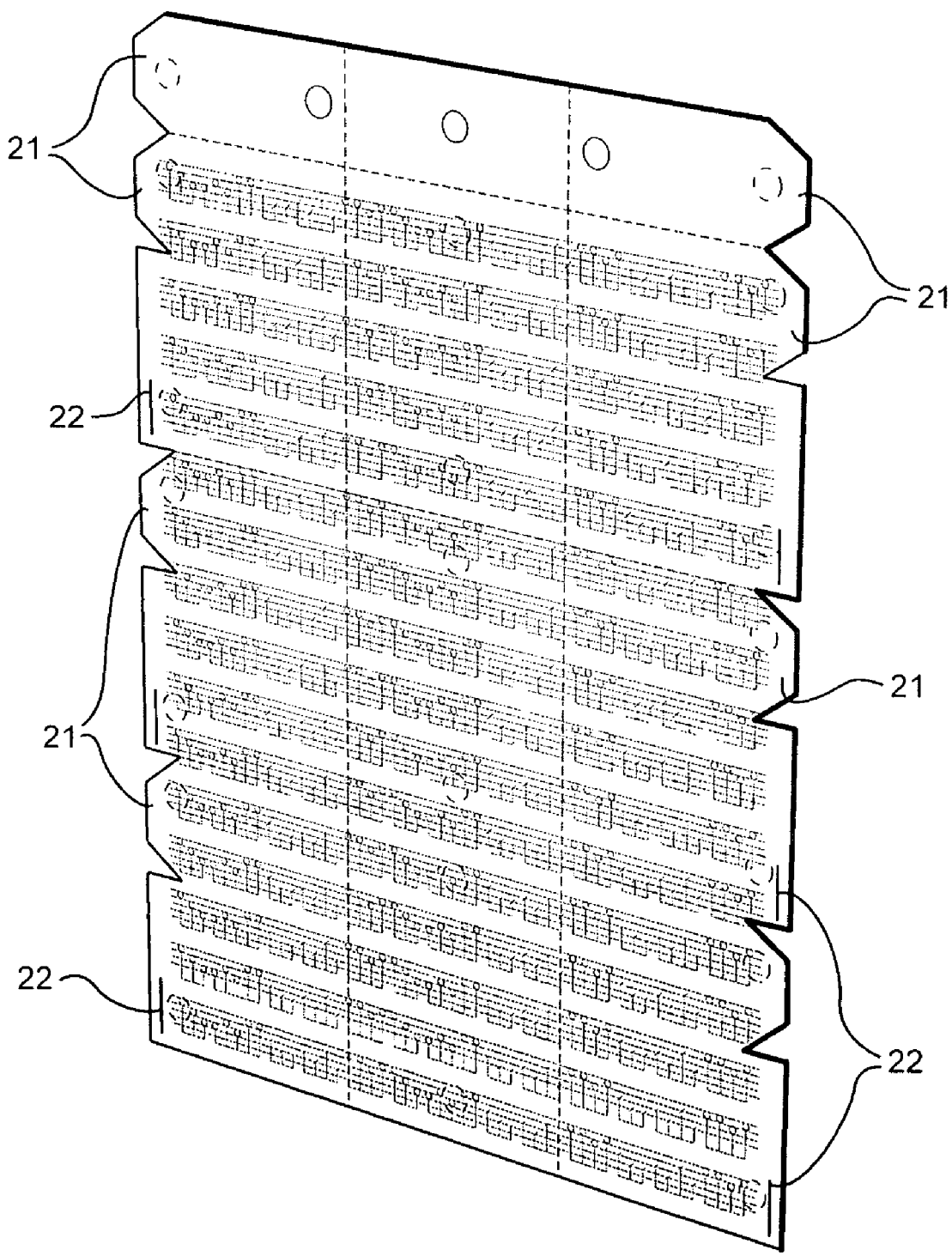
FIG. 20 is a perspective view of another alternative learning device according to another embodiment of the invention.

Furthermore, and as mentioned above with reference to FIG. 7, the tabs 21 and slits 22 are not limited to releasably maintaining contact between the front surface 13 of the hanging portion 7 and the back surface 11 of the middle row R2. Rather, as shown in FIG. 20, the main image portion 5 may also contain tabs 21 and slits 22 along the vertical edge 36 for releasably maintaining contact between any surfaces of the learning device 1. Tabs 21 fit into corresponding slits 22 to secure the learning device 1 in at least the configurations and display options shown in FIGS. 3, 8, 10, 12, 14 and 16 and described herein. Notably, the learning device 1 may include other fastening devices 14 in combination with a tab-slit joint, including but not limited to hook-and-loop fasteners, e.g., as disclosed in U.S. Pat. No. 2,717,437, adhesives, snaps, clips, hooks, latches, magnets and locks. Moreover, the location of the tabs 21 and slits 22 are not limited to the top and bottom, respectively, of each row as illustrated in FIG. 20 but, rather, may be located anywhere along the vertical edges 36, horizontal edges 6 or anywhere else on the learning device 1 that achieves the objectives as described herein. The tabs 21 may also be any shape, including but not limited to three-sided (as shown in FIG. 20), two-sided or curved, so long as contact is releasably maintained between the surfaces of the learning device 1.

Certain modifications and improvements will occur to those skilled in the art upon a reading of the foregoing description. It should be understood that all such modifications and improvements have been deleted herein for the sake of conciseness and readability but are properly within the spirit and scope of the claimed invention.

What is claimed is:

1. A learning device comprising:
at least one sheet, the sheet having a main image portion and a hanging portion;
the main image portion having a front surface and a back surface and at least three rows defined by two or more first folds and at least one column normal to the rows, the first folds intersecting the at least one column to form a grid of three or more panels;
the hanging portion having a front surface and a back surface and at least one column, the hanging portion being located along an edge of the main image portion and foldable toward the main image portion about an edge fold;
the main image portion folding about the first folds and the hanging portion folding about the edge fold to cause a portion of the front or back surface of the main image portion to be in contact with at least a portion of the front or back surface of the hanging portion to form a self-standing structure that outwardly displays a surface of the main image portion;
the contact being releasably maintained by at least one fastening device;
the main image portion folding about one of the first folds to cause a bottom row of the back surface of the main image portion to be in contact with a middle row of the back surface of the main image portion to outwardly display a bottom row of the front surface of the main image portion, the contact being releasably maintained by at least one fastening device.

2. The learning device according to claim 1, wherein the self-standing structure is triangular.

3. The learning device according to claim 1, wherein the main image portion contains indicia extending across substantially the entire front or back surface of the main image portion.

4. The learning device according to claim 1, wherein the main image portion contains indicia separately arranged within each panel on the front or back surface of the main image portion.

5. The learning device according to claim 1, the main image portion folding about one of the first folds to cause a bottom row of the front surface of the main image portion to be in contact with a middle row of the front surface of the main image portion to outwardly display a bottom row of the back surface of the main image portion, the contact being releasably maintained by at least one fastening device.

6. The learning device according to claim 1, the main image portion folding about one of the first folds to cause a middle row of the front surface of the main image portion to be in contact with a top row of the front surface of the main image portion to outwardly display a bottom row and a middle row of the back surface of the main image portion, the contact being releasably maintained by at least one fastening device.

7. The learning device according to claim 6, the main image portion folding about one of the first folds to cause the middle row of the back surface to be in contact with the bottom row of the back surface to outwardly display a top row of the back surface of the main image portion, the contact being releasably maintained by at least one fastening device.

8. The learning device according to claim 1, the main image portion folding about one of the first folds to cause a middle row of the back surface of the main image portion to be in contact with a top row of the back surface of the main image portion to outwardly display a bottom row and a middle row of the front surface of the main image portion, the contact being releasably maintained by at least one fastening device.

9. The learning device according to claim 8, the main image portion folding about one of the first folds to cause the middle row of the front surface to be in contact with the bottom row of the front surface to outwardly display a top row of the front surface of the main image portion, the contact being releasably maintained by at least one fastening device.

10. The learning device according to claim 1, wherein the hanging portion contains at least one aperture for hanging the learning device.

11. The learning device according to claim 1, the main image portion folding about the first folds to form one row and the hanging portion folding about the edge fold to cause the front or back surface of the hanging portion to be in contact with the one row to form a storage pocket along the one row, the row then folding about at least one second fold to form a pocket folder.

12. A learning device comprising:
   at least one sheet, the sheet having a main image portion and a hanging portion;
   the main image portion having a front surface and a back surface and two or more first folds defining at least three rows and one or more second folds normal to the first folds defining at least two columns, the first folds intersecting the second folds to form a grid of six or more panels, the front or back surface displaying indicia;
   the hanging portion having a front surface and a back surface and one or more second folds defining at least two columns, the hanging portion being located along an edge of the main image portion and foldable toward the main image portion about an edge fold;
   the main image portion folding about the first folds and the hanging portion folding about the edge fold to cause a portion of the front or back surface of the main image portion to be in contact with at least a portion of the front or back surface of the hanging portion to form a triangular self-standing structure that outwardly displays a surface of the main image portion;
   the main image portion folding about the first folds to form one row and the hanging portion folding about the edge fold to cause the front or back surface of the hanging portion to be in contact with the one row to form a storage pocket along the one row, the one row then folding about at least one second fold to form a pocket folder;
   the contact being releasably maintained by at least one fastening device.

13. The learning device according to claim 12, wherein the hanging portion has at least one tab that inserts into at least one slit formed in the main image portion to releasably maintain the contact between the one row and the hanging portion to secure the storage pocket.

14. The learning device according to claim 12, wherein the first and second folds and the edge fold are perforated.

15. The learning device according to claim 12, wherein the indicia extends across substantially the entire front or back surface of the main image portion.

16. The learning device according to claim 12, wherein the indicia is separately arranged within each panel on the front or back surface of the main image portion.

17. The learning device according to claim 12, the main image portion folding about one of the first folds to cause a bottom row of the front surface of the main image portion to be in contact with a middle row of the front surface of the main image portion to outwardly display a bottom row of the back surface of the main image portion, the contact being releasably maintained by at least one fastening device.

18. The learning device according to claim 12, the main image portion folding about one of the first folds to cause a middle row of the front surface of the main image portion to be in contact with a top row of the front surface of the main image portion to outwardly display a bottom row and a middle row of the back surface of the main image portion, the contact being releasably maintained by at least one fastening device.

19. The learning device according to claim 18, the main image portion folding about one of the first folds to cause the middle row of the back surface to be in contact with the bottom row of the back surface to outwardly display a top row of the back surface of the main image portion, the contact being releasably maintained by at least one fastening device.

20. A learning device comprising:
   at least one sheet of flexible support material;
   a main image portion having a front surface and a back surface and three or more separate panels of at least one sheet, the panels being fixed to the flexible support material and spaced apart to provide gaps between each panel, the gaps defining folds in the flexible support material, the main image portion having at least three rows defined by two or more first folds and at least one column normal to the rows, the rows intersecting the at least one column to form a grid of three or more panels; and
   a hanging portion having a front surface and a back surface and at least one panel of at least one sheet, the hanging portion being fixed to the flexible support material and spaced apart from the main image portion along an edge of the main image portion to provide a gap between the hanging portion and the main image portion, the gap defining an edge fold about which the hanging portion folds toward the main image portion;
   the main image portion folding about the first folds and the hanging portion folding about the edge fold to cause a portion of the front or back surface of the main image portion to be in contact with at least a portion of the front or back surface of the hanging portion to form a triangular self-standing structure that outwardly displays a surface of the main image portion;
   the main image portion folding about the first folds to form one row and the hanging portion folding about the edge fold to cause the front or back surface of the hanging portion to be in contact with the one row to form a storage pocket along the one row, the one row then folding about at least one second fold to form a pocket folder;
   the contact being releasably maintained by at least one fastening device.

21. The learning device according to claim 20, wherein the front surface of the main image portion contains indicia that extends across substantially the entire front surface of the main image portion.

22. The music learning device according to claim 20, wherein the back surface of the main image portion contains indicia separately arranged within each panel.

23. A learning device comprising:
- at least one sheet, the sheet having a main image portion and a hanging portion;
- the main image portion having a front surface and a back surface and at least three rows defined by two or more first folds and at least one column normal to the rows, the first folds intersecting the at least one column to form a grid of three or more panels;
- the hanging portion having a front surface and a back surface and at least one column, the hanging portion being located along an edge of the main image portion and foldable toward the main image portion about an edge fold;
- the main image portion folding about the first folds and the hanging portion folding about the edge fold to cause a portion of the front or back surface of the main image portion to be in contact with at least a portion of the front or back surface of the hanging portion to form a self-standing structure that outwardly displays a surface of the main image portion;
- the contact being releasably maintained by at least one fastening device;
- wherein the learning device comprises a back surface transparent sheet covering the back surface of the main image portion and the back surface of the hanging portion and a front surface transparent sheet covering the front surface of the main image portion and the front surface of the hanging portion, the back surface transparent sheet contacting the front surface transparent sheet along at least a periphery of the at least one sheet to encase the at least one sheet entirely within the transparent sheets.

* * * * *